(12) United States Patent
Kwon et al.

(10) Patent No.: US 11,991,220 B2
(45) Date of Patent: May 21, 2024

(54) ELECTRONIC DEVICE PERFORMING CALL WITH USER OF METAVERSE AND METHOD FOR OPERATING THE SAME

(71) Applicant: Samsung Electronics Co., Ltd., Suwon-si (KR)

(72) Inventors: Yongsuk Kwon, Suwon-si (KR);
Sooyoung Nam, Suwon-si (KR);
Youngjun Seo, Suwon-si (KR);
Munhwan Choi, Suwon-si (KR);
Sunmin Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/447,732

(22) Filed: Aug. 10, 2023

(65) Prior Publication Data

US 2024/0114062 A1 Apr. 4, 2024

Related U.S. Application Data

(63) Continuation of application No. PCT/KR2023/009715, filed on Jul. 10, 2023.

(30) Foreign Application Priority Data

Oct. 4, 2022 (KR) .................. 10-2022-0126345

(51) Int. Cl.
*G06T 13/40* (2011.01)
*G06T 19/00* (2011.01)
(Continued)

(52) U.S. Cl.
CPC .......... *H04L 65/1069* (2013.01); *G06T 13/40* (2013.01); *G06T 19/006* (2013.01); *H04L 65/1096* (2013.01)

(58) Field of Classification Search
CPC ............. H04L 65/1069; H04L 65/1083; H04L 65/1094; H04L 65/1095; H04L 65/1096; H04L 65/1011; G06T 13/40
(Continued)

(56) References Cited

U.S. PATENT DOCUMENTS 9,584,946 B1 * 2/2017 Lyren ...................... H04S 7/30
10,455,191 B2 * 10/2019 Bracken ................ H04M 3/565
(Continued)

FOREIGN PATENT DOCUMENTS

CA 2842166 A1 * 11/2012 ............. G06Q 30/02
CA 2779904 A1 * 12/2012 ......... G06F 3/04847
(Continued)

OTHER PUBLICATIONS

Search Report dated Oct. 11, 2023 in International Patent Application No. PCT/KR2023/009715.
(Continued)

*Primary Examiner* — Khanh Q Dinh
(74) *Attorney, Agent, or Firm* — Nixon & Vanderhye, P.C.

(57) ABSTRACT

An example electronic device may include at least one processor and a communication device. The at least one processor may be configured to identify a call generating request for first user identification information defined in a first metaverse service; establish, through the communication device, a media session between the electronic device and a first server corresponding to the first metaverse service, based on the call generating request; receive, through the communication device, first data for representing a virtual space associated with an avatar corresponding to the first user identification information, using the media session; provide first content representing the virtual space associated with the avatar using the received first data;
(Continued)

transmit, through the communication device, a message including user manipulation information input corresponding to the content; receive, through the communication device, second data for representing a virtual space associated with the avatar set based on the user manipulation information, using the media session; and provide second content representing the virtual space associated with the avatar using the received second data.

20 Claims, 20 Drawing Sheets

(51) Int. Cl.
    *H04L 65/1069*     (2022.01)
    *H04L 65/1096*     (2022.01)

(58) Field of Classification Search
    USPC ................ 709/220, 224, 225, 226, 228
    See application file for complete search history.

(56) References Cited

U.S. PATENT DOCUMENTS

| | | | |
|---|---|---|---|
| 10,668,382 B2 | 6/2020 | Khan et al. | |
| 11,082,661 B1 | 8/2021 | Pollefeys | |
| 2011/0317593 A1* | 12/2011 | Bonkowski | H04M 3/567 370/260 |
| 2015/0244987 A1 | 8/2015 | Delegue et al. | |
| 2016/0174074 A1* | 6/2016 | Kim | H04M 3/42204 455/414.1 |
| 2016/0232941 A1 | 8/2016 | Cunico et al. | |
| 2017/0064250 A1 | 3/2017 | Isselhardt et al. | |
| 2018/0139565 A1* | 5/2018 | Norris | H04S 1/007 |
| 2021/0358222 A1* | 11/2021 | Pejsa | G06F 3/0346 |
| 2023/0137219 A1 | 5/2023 | Kim et al. | |
| 2023/0298008 A1* | 9/2023 | Sarin | G06Q 30/0271 705/69 |
| 2024/0013166 A1* | 1/2024 | Padiyar | G06Q 20/042 |

FOREIGN PATENT DOCUMENTS

| | | | | |
|---|---|---|---|---|
| CN | 106341644 A | | 1/2017 | |
| EP | 2538610 A1 | * | 12/2012 | ......... G06F 3/04847 |
| JP | 7041254 B2 | | 3/2022 | |
| KR | 10-2006-0104135 | | 10/2006 | |
| KR | 10-2011-0025720 | | 3/2011 | |
| KR | 10-2017-0026271 | | 3/2017 | |
| KR | 10-2020-0122218 | | 10/2020 | |
| KR | 102382521 B1 | | 4/2022 | |
| KR | 10-2402580 | | 5/2022 | |
| KR | 102402580 B1 | | 5/2022 | |
| WO | WO-2005004448 A1 | * | 1/2005 | ........ H04M 3/42042 |

OTHER PUBLICATIONS

Written Opinion dated Oct. 11, 2023 in International Patent Application No. PCT/KR2023/009715.

* cited by examiner

ELECTRONIC DEVICE PERFORMING CALL WITH USER OF METAVERSE AND METHOD FOR OPERATING THE SAME

CROSS REFERENCE TO RELATED APPLICATIONS

This application is a continuation application of International Application No. PCT/KR2023/009715 designating the United States, filed on Jul. 10, 2023, in the Korean Intellectual Property Receiving Office and claiming priority to Korean Patent Application No. 10-2022-0126345, filed on Oct. 4, 2022, in the Korean Intellectual Property Office, the disclosures of each of which are incorporated by reference herein in their entireties.

BACKGROUND

Field

The disclosure relates to an electronic device performing a call with a metaverse user and a method for operating the same.

Description of Related Art

Metaverse-related content is being actively provided. For example, metaverse-related content based on a virtual space, by which users can perform designated activities within the virtual space through an avatar may be provided. For example, with respect to the real environment, additional information or metaverse-related content based on an augmented reality that allows other objects to appear overlapped on the real environment may be provided. As metaverse-related content is advanced, a number of users may access the metaverse service.

Users accessing a metaverse service may perform conversation based on chatting or voice chatting provided from the metaverse service or, as the avatars of a plurality of users are located in one designated virtual space, conversation may be conducted in an environment, such as video chatting.

SUMMARY

According to an example embodiment, an electronic device may include at least one processor and a communication device (including, e.g., a communication circuit). The at least one processor may be configured to identify a call generating request for first user identification information defined in a first metaverse service; establish, through the communication device, a media session between the electronic device and a first server corresponding to the first metaverse service, based on the call generating request; receive, through the communication device, first data for representing a virtual space associated with an avatar corresponding to the first user identification information, using the media session; provide first content representing the virtual space associated with the avatar using the received first data; transmit, through the communication device, a message including user manipulation information input corresponding to the content; receive, through the communication device, second data for representing a virtual space associated with the avatar set based on the user manipulation information, using the media session; and provide second content representing the virtual space associated with the avatar using the received second data.

According to an example embodiment, a method for operating the electronic device may include identifying a call generating request for first user identification information defined in a first metaverse service; establishing a media session between an electronic device and a first server corresponding to the first metaverse service, based on the call generating request; receiving first data for representing a virtual space associated with an avatar corresponding to the first user identification information, using the media session; providing first content representing the virtual space associated with the avatar, using the received first data; transmitting a message including user manipulation information input corresponding to the content; receiving second data for representing a virtual space associated with an avatar set based on the user manipulation information, using the media session; and providing second content representing the virtual space associated with the avatar, using the received second data.

According to an example embodiment, in a non-transitory storage medium storing at least one computer-readable instruction, the at least one instruction, when executed by at least one processor of an electronic device, may enable the electronic device to perform at least one operation including identifying a call generating request for first user identification information defined in a first metaverse service; establishing a media session between an electronic device and a first server corresponding to the first metaverse service, based on the call generating request; receiving first data for representing a virtual space associated with an avatar corresponding to the first user identification information, using the media session; providing first content representing the virtual space associated with the avatar, using the received first data; transmitting a message including user manipulation information input corresponding to the content; receiving second data for representing a virtual space associated with an avatar set based on the user manipulation information, using the media session; and providing second content representing the virtual space associated with the avatar, using the received second data.

According to an example embodiment, an electronic device may include at least one processor and a communication device. The at least one processor may be configured to access, through the communication device, a first server corresponding to a first metaverse service, based on first user identification information defined in the first metaverse service; receive, through the communication device, first data for representing a virtual space associated with an avatar corresponding to the first user identification information about the first metaverse service; provide first content representing the virtual space using the received first data; further provide, while providing the first content, an object indicating that a video call based on second user identification information about the first metaverse service is requested; transmit, through the communication device, an accept message for the video call to the first server, based on identifying acceptance for the video call corresponding to the object; receive second data for representing the virtual space and an image corresponding to the second user identification information; and provide first content representing the virtual space and the image using the received second data.

According to an example embodiment, a method for operating an electronic device may include accessing, through the communication device, a first server corresponding to a first metaverse service, based on first user identification information defined in the first metaverse service; receiving, through the communication device, first data for representing a virtual space associated with an avatar corresponding to the first user identification information about the first metaverse service; providing first content representing the virtual space, using the received first data; further providing, while providing the first content, an object indicating that a video call based on second user identification information about the first metaverse service is requested; transmitting, through the communication device, an accept message for the video call to the first server, based on identifying the acceptance for the video call corresponding to the object; receiving second data for representing the virtual space and an image corresponding to the second user identification information; and providing first content representing the virtual space associated with the avatar and the image using the received second data.

According to an example embodiment, in a non-transitory storage medium storing at least one computer-readable instruction, the at least one instruction, when executed by at least one processor of an electronic device, may enable the electronic device to perform at least one operation including accessing, through the communication device, a first server corresponding to a first metaverse service, based on first user identification information defined in the first metaverse service; receiving, through the communication device, first data for representing a virtual space associated with an avatar corresponding to the first user identification information about the first metaverse service; providing first content representing the virtual space, using the received first data; further providing, while providing the first content, an object indicating that a video call based on second user identification information about the first metaverse service is requested; transmitting, through the communication device, an accept message for the video call to the first server, based on identifying acceptance for the video call corresponding to the object; receiving second data for representing the virtual space and an image corresponding to the second user identification information; and providing first content representing the virtual space and the image using the received second data.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
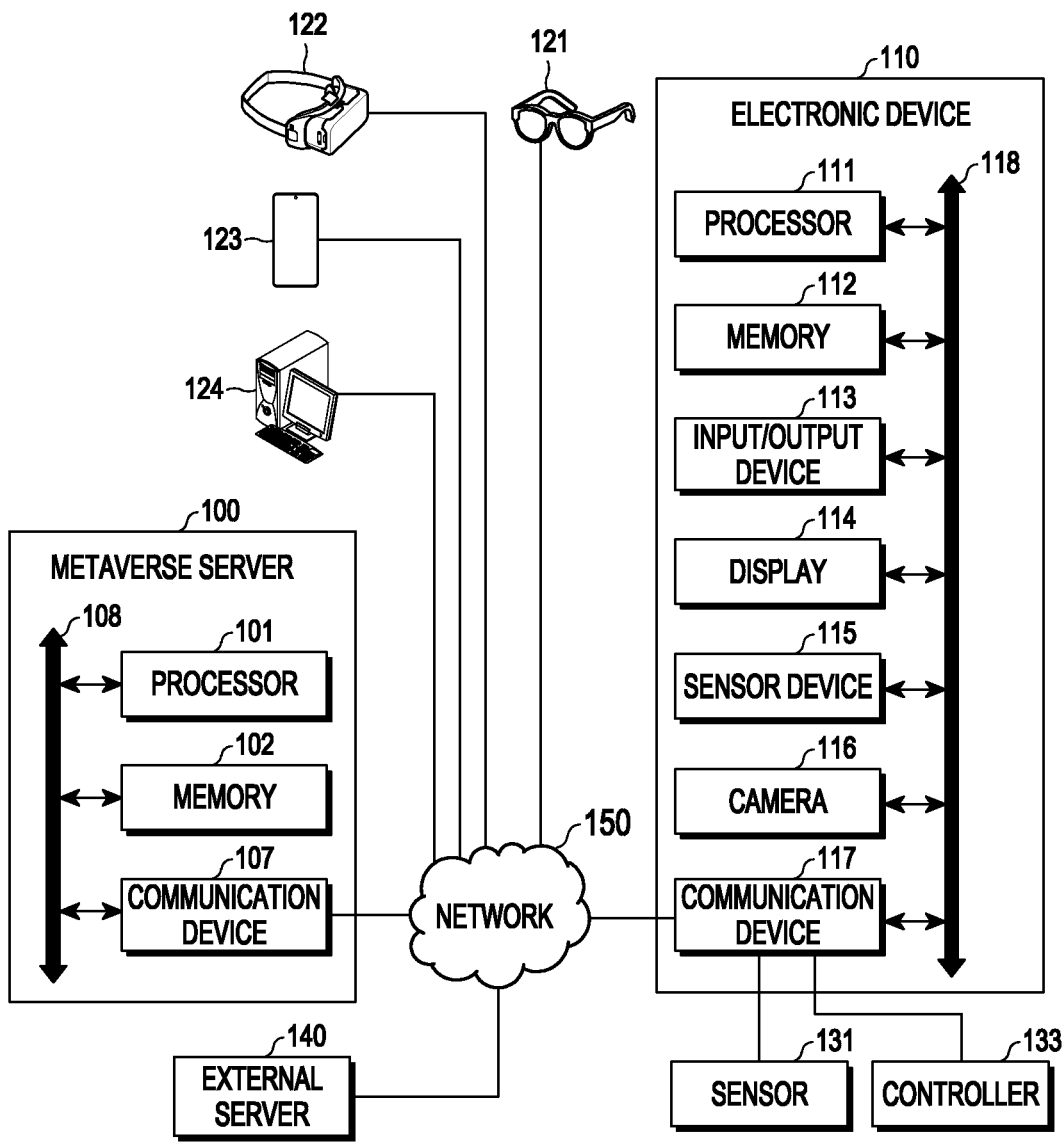
FIG. 1 is a view illustrating an example artificial reality providing system according to an embodiment.

FIG. 1 is a view illustrating an example artificial reality providing system according to an embodiment.

According to an embodiment, the artificial reality providing system may include at least one of a server 100, an electronic device 110, at least one external electronic device 121, 122, 123, or 124, or an external server 140.

According to an embodiment of the disclosure, the server 100 may generate data for representing artificial reality (e.g., at least one of an augmented reality environment or a virtual reality environment). In addition to augmented reality or virtual reality, the server 100 may provide content capable of enhancing user immersion, and such content may be referred to, for example, as content for a metaverse. The server 100 may include a processor 101, a memory 102, and/or a communication device 107 (including, e.g., a communication circuit). Meanwhile, it is merely by way of example that the server 100 includes the processor 101, the memory 102, and/or the communication device 107, and at least some of the operations of the server 100 may be implemented by a cloud server. It will be understood by one of ordinary skill in the art that the server 100 may be implemented as a distributed server, and the implementation form of the server is not limited.

According to an embodiment, the processor 101 may execute commands (or instructions) included in a program (or application) stored in the memory 102. The processor 101 may include, e.g., a central processing unit (CPU), a graphic processing unit (GPU), a neural processing unit (NPU), a sensor processing unit (TPU), a digital signal processor (DSP), an application-specific integrated circuit (ASIC), a field programmable gate array (FPGA), and/or a programmable logic device but, without any limitations thereto, may be any means that may execute a program (or commands or instructions). The processor 101 may execute a program for artificial reality. In the memory 102, a program for artificial reality may be stored. According to an embodiment, the memory 102 may include a volatile memory and/or a non-volatile memory, and may include, for example, a hard disk storage device, RAM, ROM, and/or flash memory, but this is merely by way of example without limitation and the disclosure is not limited in this regard. The program for artificial reality is a program for a server, and may cause, for example, generation of data for representing artificial reality, provision of the generated data, identification of a user input, and/or generation and provision of data for representing updated artificial reality based on the identified user input, and may include commands (or instructions) corresponding to at least some operations performed by the server 100. The communication device 107 may support establishing a communication channel between the server 100 and the electronic device 110 through the network 150 and performing communication through the established communication channel. The communication device 107 may, for example, be a device capable of providing a wide area network (e.g., the Internet), but is not limited thereto. The operation(s) performed by the server 100 may be performed by, for example, the processor 101, or may be performed by other hardware under the control of the processor 101. Commands (or instructions) causing the server 100 to perform operations may be stored in the memory 102. The processor 101, the memory 102, and/or the communication device 107 may transmit/receive data via the bus 108 (or a communication interface or a network) of the server 100.

According to an embodiment, the electronic device 110 may perform at least one operation (e.g., including, but not limited to, providing visual content (e.g., an image), providing auditory content (e.g., a voice), providing tactile content (e.g., vibration), and/or providing olfactory content (e.g., smell)) for representing artificial reality, using data for representing artificial reality. A user who owns or wears the electronic device 110 may experience artificial reality based on content provided from the electronic device 110. The electronic device 110 may include at least one of a processor 111, a memory 112, an input/output device 113, a display 114, a sensor device 115, a camera 116, or a communication device 117. The processor 111 may include, for example, a CPU, a GPU, an NPU, a TPU, a DSP, an ASIC, an FPGA, and/or a programmable logic device, but is not limited thereto provided that the means is capable of executing a program (or instructions or commands). For example, the processor 111 may execute a program for artificial reality. A program for artificial reality may be a program for a client, and may cause, for example, reception of data for representing artificial reality from the server 100, provision of at least one operation (which may include, but is not limited to, for example, provision of visual content (e.g., image), provision of auditory content (e.g., voice), provision of tactile content (e.g., vibration), and/or provision of olfactory content (e.g., smell)) for representing artificial reality based on the received data, identification of a user input, and/or transmission of a user input (or a command corresponding to the user input) to the server 100, and may include commands (or instructions) corresponding to at least some operations performed by the electronic device 110. According to an embodiment, the memory 112 may include a volatile memory and/or a non-volatile memory, and may include, e.g., a hard disk storage device, RAM, ROM, and/or flash memory, but this is by way of example and the disclosure is not limited in this regard. According to an embodiment, the input/output device 113 may include a touch pad, a button, a mouse, a digital pen, and/or a microphone, but is not limited thereto as long as it is a device for receiving (or sensing) a user input. For example, the touch screen panel, which is one example of the input/output device 113, may be implemented integrally with the display 114. The input/output device 113 may include a speaker, a haptic module, and/or a light emitting module, but is not limited thereto as long it is a device for outputting content related to artificial reality. According to an embodiment, the sensor device 115 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor. According to an embodiment, the camera 116 may include one or more lenses, image sensors, image signal processors, or flashes. According to an embodiment, the communication device 117 may support establishing a communication channel between the server 100 and the electronic device 110 through the network 150 and performing communication through the established communication channel. The communication device 117 may be, for example, a device capable of providing a wide area network (e.g., the Internet), but is not limited thereto. The communication device 117 may support wired communication and/or wireless communication. For example, the communication device 117 may support short-range communication (e.g., short-range communication such as Bluetooth, wireless fidelity (Wi-Fi) direct, or infrared data association (IrDA)). The communication device 117 may transmit and receive data to and from the external sensor 131 and/or the external controller 133 based on short-range communication. For example, when the electronic device 110 is implemented as a standalone type, the communication device 117 may support a function of wirelessly accessing the network 150. The communication device 117 may support cellular communication such as LTE, 5G, or 6G, and/or IEEE 802 series-based communication (e.g., may be referred to as Wi-Fi). The communication device 117 may be implemented to support wired communication, and the implementation method thereof is not limited. When the electronic device 110 is implemented as a non-standalone type, the electronic device 110 may communicate with the server 100 through a relay device connectable to the network 150. In this case, the communication device 117 may support short-range communication such as Bluetooth, wireless fidelity (Wi-Fi) direct, or infrared data association (IrDA), and may perform communication with the server 100 through the relay device using the short-range communication. The external sensor 131 may include a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, and/or an illuminance sensor. The operation(s) performed by the electronic device 110 may be performed by, for example, the processor 101 or may be performed by other hardware devices under the control of the processor 101. Commands (or instructions) causing the electronic device 110 to perform operations may be stored in the memory 112. The processor 111, the memory 112, the input/output device 113, the display 114, the sensor device 115, the camera 116, and/or the communication device 117 may transmit/receive data via the bus 118 (or a communication interface or a network) of the electronic device 110. Meanwhile, it is merely by way of example without limitation that the server 100 and the electronic device 110 transmit and receive data based on an application for artificial reality, and those skilled in the art will understand that the server 100 and the electronic device 110 may transmit and receive other data including, for example, at least some data based on the web.

According to an embodiment, the external sensor 131 may be, for example, a ring-type device, a bracelet-type device, or a head-mounted device, but is not limited to any particular type and/or body part of the user to which the sensor is attached. The external sensor 131 may provide data sensed based on short-range communication to the electronic device 110. The controller 133 may include, e.g., a touch pad, a button, a mouse, a digital pen, and/or a microphone, but is not limited thereto provided it is a device for receiving (or sensing) a user input. The controller 133 may provide data obtained based on short-range communication to the electronic device 110. In an embodiment, the controller 133 may further include at least one sensor in addition to a device for receiving a user input. In this case, the controller 133 may provide data and/or sensing data associated with the user input to the electronic device 110 based on short-range communication.

According to an embodiment, the server 100 may transmit and receive data to and from the at least one external electronic device 121, 122, 123, and 124. The server 100 may transmit, to the electronic device 110, data for representing the artificial reality updated and/or changed based on the data from the at least one external electronic device 121, 122, 123, or 124. The electronic device 110 may perform at least one operation for representing artificial reality based on data. Accordingly, when a plurality of users are in one artificial reality, an artificial reality reflecting an operation by one user may be provided to another user.

According to an embodiment, the external server 140 may transmit and receive data to and from the server 100 through the network 150. The external server 140 may be, for example, a server supporting the same application (or the same artificial reality) as the server 100. Alternatively, the external server 140 may be a server that supports an application (or different artificial reality) different from the server 100. In this case, the server 100 may convert data of the external server 140 into a format of an application (or artificial reality) supported by the server 100. The server 100 may transmit data for representing artificial reality reflecting the converted data to the electronic device 110. As described above, the server 100 may interact with an artificial reality different from the supported artificial reality, and such a function may be referred to as a multiverse function.

<Embodiments of Virtual Reality>

According to an embodiment, the electronic device 110 may be a head mounted device (HMD) supporting virtual reality or a smartphone connectable to a structure that may be fixed to the head. The user may observe each of a left-eye image and a right-eye image for representing the virtual reality displayed on the display 114 with both eyes while wearing the HMD on the head or wearing a structure to which a smartphone is connected on the head. Alternatively, the user may observe an image for representing virtual reality displayed on the display 114 of the electronic device 110 without wearing the electronic device 110 on the head. In this case, the electronic device 110 may be implemented as a smartphone, a tablet, a general-purpose computer, or a smart mirror, but is not limited thereto.

According to an embodiment, the server 100 may generate data for representing at least one space (or a scene gazing at the corresponding space) of virtual reality. For example, the server 100 may receive information about the first user (e.g., account information about the first user and/or information for authentication) from the electronic device 110. The server 100 may perform a log-in procedure of the first user based on the information about the first user. The server 100 may identify a space corresponding to the first user in the virtual reality. For example, the server 100 may identify a space privately allocated to the first user. For example, the server 100 may identify a space corresponding to the location of the first user in the open space. For example, the server 100 may identify a space corresponding to a user input. The method in which the server 100 identifies the space corresponding to the location of the first user is not limited. For example, at least one object and/or an avatar (or character) corresponding to the user may be included in the identified space. When the viewpoint of the scene is a first-person viewpoint, the data for representation may be related to a scene in which the identified space is viewed from a user's point of view. In various cases, the scene viewing at the identified space may not include an avatar (or a character) corresponding to the first user, or may include only a part (e.g., a hand, etc.) of the body, but is not limited thereto, or may include the back of the avatar. When a viewpoint of the scene is a third person viewpoint, the data for representation may be related to the scene in which the space including the avatar (or character) corresponding to the user is viewed from one direction.

According to an embodiment, the scene viewed from the user's point of view may include an avatar corresponding to another user. For example, the second user may access the server 100 using the external electronic device 122. The server 100 may generate data for representing artificial reality used together by the first user and the second user. For example, when both the first user and the second user are present in a specific space, the server 100 may generate data for representing artificial reality used together by the first user and the second user. For example, when the viewpoint of the scene is a first person viewpoint, a scene for the first user may include at least a portion of the avatar of a second user. For example, when the viewpoint of the scene is a third-person viewpoint, the scene for the first user may include at least a portion of the first avatar (or character) corresponding to the first user and/or at least a portion of the second avatar (or character) corresponding to the second user. In an embodiment, at least a portion of the screen displayed on the electronic device 110 may be provided to the server 100. At least a portion (or an object corresponding to at least a portion) of the screen displayed on the electronic device 110 may be disposed in the virtual reality space.

According to an embodiment, the server 100 may receive a user input and/or a command corresponding to the user input from the electronic device 110. For example, the electronic device 110 may identify a user input through the input/output device 113. For example, the electronic device 110 may identify a user input through the built-in sensor device 115. For example, the electronic device 110 may obtain (or receive) a user input from the external sensor 131 and/or the controller 133 connected through the communication device 117. The processor 111 may identify motion information about the electronic device 110 as a user input, based on sensing data identified through the sensor device 115. For example, the electronic device 110 may obtain a user input from the external sensor 131 and/or the controller 133 connected through the communication device 117.

According to an embodiment, the electronic device 110 may identify a command based on a user input. The command may include, for example, moving in virtual reality, designating an object in virtual reality, manipulating an object in virtual reality, and/or interacting with another avatar, but is not limited thereto. The electronic device 110 may transmit a command to the server 100. For example, the electronic device 110 may transmit the user input to the server 100 without identifying the command based on the user input, and in this case, the server 100 may identify the command based on the user input.

According to an embodiment of the disclosure, the server 100 may update the virtual reality space or change the virtual reality space to another space based on a command. For example, when the command is a designation of the object, the space may be updated to reflect a function connected to the designated object. For example, when the command is the manipulation of the object, the space may be updated to change a position of the corresponding object. For example, when the command is to perform an operation of the avatar, a space may be updated so that the avatar of the user performs a corresponding reaction. For example, when the command is an interaction with another avatar, the space may be updated so that the corresponding avatar performs a corresponding reaction. For example, when the command is moved, the space for displaying may be changed to another space. It will be understood by one of ordinary skill in the art that there is no limitation to space updates and/or changes in command-based virtual reality. In addition to updating and/or changing visual content, the server 100 may provide auditory content, tactile content, and/or olfactory content. The server 100 may relay voice data and/or text for chatting between users. For example, the server 100 may update and/or change a space using association information between command and update and/or change. For example, the server 100 may store an artificial intelligence model that receives a user input and/or a command as an input value and outputs an update and/or change of a space as an output value. The server 100 may update and/or change the space based on the output value of the artificial intelligence model. For example, the server 100 may store an artificial intelligence model that updates and/or changes a space based on a context of the corresponding space without a user input. The server 100 may update and/or change the space based on the context of the corresponding space using the artificial intelligence model.

According to an embodiment, the server 100 may transmit data for representing the updated space and/or data for representing the changed space to the electronic device 110. The server 100 may transmit data for representing the updated space and/or data for representing the changed space to the external electronic device 122 corresponding to the second user. Accordingly, in the external electronic device 122, the virtual reality reflecting the space updated by the first user of the electronic device 110 may be expressed. Further, based on information (e.g., a user input and/or a command) transmitted from the external electronic device 122 to the server 100, the server 100 may update a space used (or present) by both the first user and the second user. The server 100 may transmit data for representing the updated space to the electronic device 110. The electronic device 110 may represent the updated space based on the received data. As described above, the server 100 may share the updated space corresponding to any one user with an electronic device of another user corresponding to the corresponding space. For example, updating and/or changing a time-series space may be referred to as a user experience. The server 100 and/or the electronic device 110 may store at least one piece of data associated with the user experience in the memory 102 and/or 112. For example, the server 100 may store at least one piece of data associated with the user experience for each user (e.g., for each user account). For example, the server 100 and/or the electronic device 110 may store, in the memory 102 and/or 112, data for representing one viewpoint of the user experience. For convenience of description, this may be expressed as capturing the user experience. The server 100 may store data associated with the user experience, which may be referred to as life logging. The server 100 may additionally store data associated with the user. For example, the server 100 may receive at least one piece of sensing data from the electronic device 110, store the at least one piece of sensing data in time series, or update a final value. The server 100 may generate a user (e.g., avatar) in virtual reality corresponding to the user of the real world based on at least one piece of sensing data, which may be referred to as a digital twin.

<Embodiments of Augmented Reality>

According to an embodiment, the electronic device 110 may provide content for augmented reality, which represents at least one visual object that may be superimposed on the actual environment viewed by a specific user. Meanwhile, those skilled in the art will understand that at least some of the operations of the server 100 and/or the electronic device 110 described in the embodiment of the virtual reality may be performed by the server 100 and/or the electronic device 110 described in the embodiment of the augmented reality, and vice versa. According to an embodiment, the electronic device 110 may be a glasses-type electronic device supporting augmented reality, a smart lens, or a smartphone capable of displaying a captured image in real time. The user may observe the visual object displayed on the transparent display (or the semi-transparent display) of the glasses-type electronic device or the smart lens together with the actual environment while wearing the glasses-type electronic device or the smart lens. Alternatively, the user may observe the image captured by the smartphone and the visual object displayed to overlap the image.

According to an embodiment, the electronic device 110 may obtain a foreground image through the camera 116 (e.g., a camera facing forward). The electronic device 110 may transmit the foreground image, a portion of the foreground image, or 3D modeling data obtained based on the foreground image to the server 100 via the communication device 117. The electronic device 110 may identify the orientation of the electronic device 110 based on the captured image and/or sensing data from the sensor device 115. The electronic device 110 may transmit orientation data of the electronic device 110 through the communication device 117. The electronic device 110 may obtain a captured image of the user's eyes using the camera 116 (e.g., a camera facing backward). The electronic device 110 may identify the user's gaze based on the captured image of the eye. The electronic device 110 may transmit data on the gaze of the user through the communication device 117.

According to an embodiment of the disclosure, the server 100 may generate data for representing at least one visual object that may be superimposed on the actual environment viewed by the specific user, as data for representing artificial reality. For example, the server 100 may analyze data (data associated with the foreground image, the orientation of the electronic device 110, and/or the user's gaze) received from the electronic device 110, and identify at least one visual object based on the analysis result. The server 100 may transmit data for representing at least one visual object to the electronic device 110 through the communication device 107. At least one visual object may be displayed, e.g., by the display 114 of the electronic device 110, and the user may observe at least one visual object superposed on the actual environment. For example, the visual object may have information and/or a shape associated with an object disposed in the actual environment. In this case, the electronic device 110 may display the visual object so that the visual object may be observed by the user as if the visual object is located near the object disposed in the actual environment.

According to an embodiment, the electronic device 110 may identify a user input. For example, the electronic device 110 may identify a user input through the input/output device 113 and/or the external sensor 131 and/or the controller 133. The user input may cause, for example, designation and/or manipulation of a displayed visual object. The electronic device 110 may transmit a user input and/or a command corresponding to the user input to the server 100. The server 100 may generate data for representing artificial reality based on a user input and/or a command corresponding to the user input. For example, the server 100 may identify that the user input is based on the designation and/or manipulation of the visual object, and provide another visual object corresponding to the deformation of the visual object, the movement of the visual object, and/or the function of the visual object in response thereto, but the performing operation is not limited thereto. The server 100 may transmit data for representing artificial reality generated based on a user input and/or a command corresponding to the user input to the electronic device 110. The electronic device 110 may provide content associated with artificial reality based on data for representing artificial reality. As described above, the server 100 and/or the electronic device 110 may provide the function that allows the user to interact with the visual object.

In an embodiment, the server 100 may generate an avatar (or character) corresponding to another user as data for representing artificial reality. The server 100 may transmit an avatar (or character) corresponding to another user to the electronic device 110. The electronic device 110 may display an avatar (or character) corresponding to another user using the received data for representing artificial reality. Accordingly, the user may, for example, observe an avatar (or character) corresponding to another user superposed on the actual environment. Accordingly, the user may have such an experience as if an avatar (or character) corresponding to another user is located in the actual environment. The avatar (or character) corresponding to another user may be manipulated by, for example, a user input obtained (or received) from the external electronic device 121, 122, 123, or 124, and/or may be manipulated based on an artificial intelligence model stored in the server 100, and there is no limitation on the manipulation method of the avatar (or character). Based on the avatar (or character) being manipulated, the server 100 may transmit data for representing the manipulated avatar (or character) to the electronic device 110. The electronic device 110 may, for example, represent an avatar (or character) manipulated based on the received data, and accordingly, the user may have such an experience as if the avatar (or character) corresponding to another user operates in the actual environment. As described above, the server 100 and/or the electronic device 110 may store a user experience associated with augmented reality in the memory 102 and/or 112. For example, the server 100 may store at least one piece of data associated with a user experience associated with augmented reality for each user (e.g., for each user account). For example, the server 100 and/or the electronic device 110 may store, in the memory 102 and/or 112, data for representing one viewpoint of the user experience associated with augmented reality.

Meanwhile, it is by way of example that the server 100 and the electronic device 110 generate and express data for representing artificial reality. According to an embodiment, the electronic device 110 may generate data for representing artificial reality and/or may generate data for artificial reality based on data from the external electronic device 121, 122, 123, or 124. In this case, the electronic device 110 may generate data for representing artificial reality without data from the server 100.

Figure 2A:
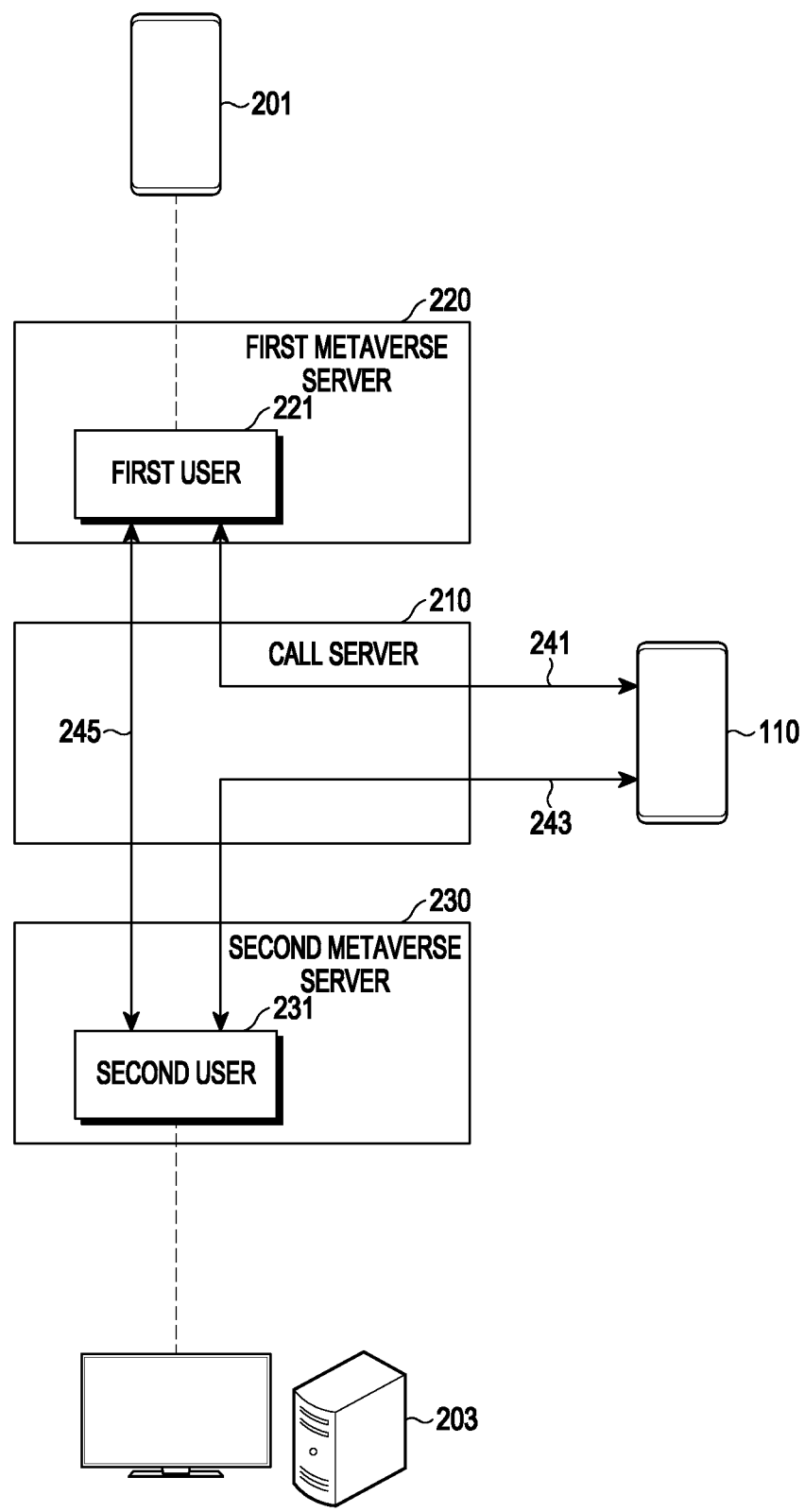
FIG. 2A is a view illustrating an example call between a user and an electronic device in a metaverse according to an embodiment.
Figure 2B:
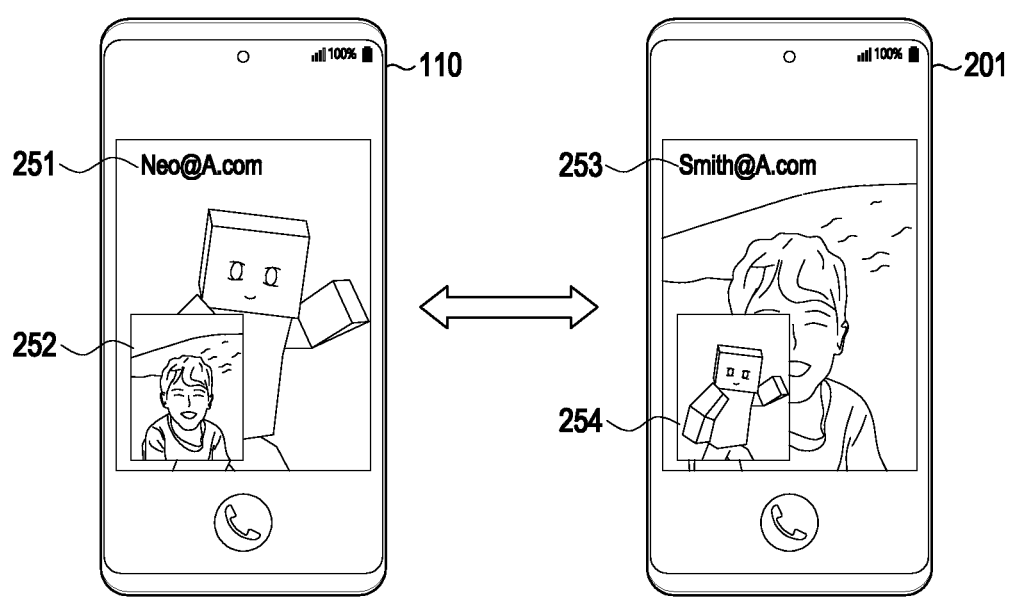
FIG. 2B is a view illustrating example content provided by an electronic device and an external electronic device according to an embodiment.
Figure 2C:
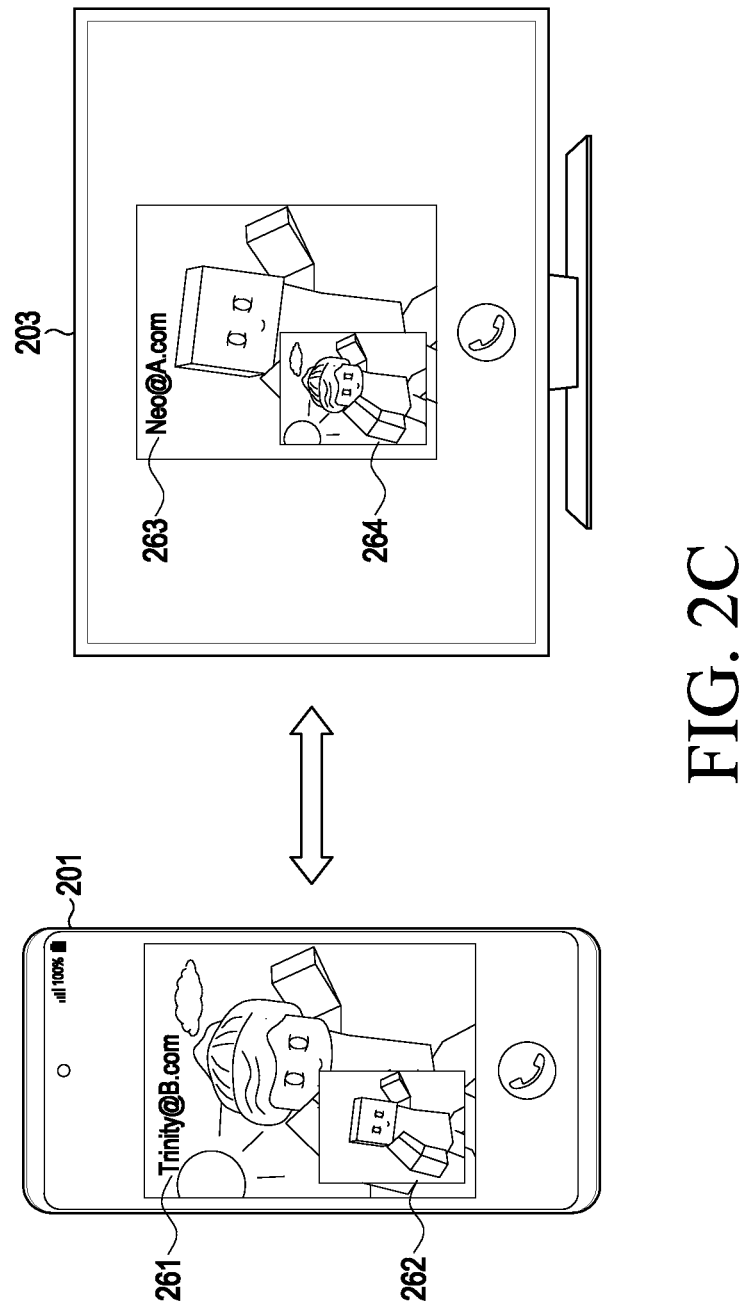
FIG. 2C is a view illustrating example content provided by external electronic devices according to an embodiment.

FIG. 2A is a view illustrating an example call between a user and an electronic device in a metaverse according to an embodiment. The embodiment of FIG. 2A is described with reference to FIGS. 2B and 2C. FIG. 2B is a view illustrating example content provided by an electronic device and an external electronic device according to an embodiment. FIG. 2C is a view illustrating example content provided by external electronic devices according to an embodiment.

According to an embodiment, the electronic device 110 may communicate with a call server 210. The metaverse servers 220 and 230 may communicate with the call server 210. The metaverse servers 220 and 230 may be, for example, the server 100 described with reference to FIG. 1, and may provide data for representing content for virtual reality and/or augmented reality. For example, the first metaverse server 220 may provide a first metaverse service and/or manage a user registered in the first metaverse service. For example, the second metaverse server 230 may provide the second metaverse service and/or manage a user registered in the second metaverse service.

According to an embodiment, the call server 210 may operate based on, for example, an internet protocol multimedia subsystem (IMS), a session initiation protocol (SIP), a rich communication service (RCS), and/or a message session relay protocol (MSRP), but the disclosure is not limited in this regard. For example, the call server 210 may include an IMS-related entity (e.g., an IMS core). For example, the call server 210 may include an RCS server, but the disclosure is not limited in the regard. The electronic device 110 may perform, for example, a registration procedure with an IMS core. The metaverse servers 220 and 230 may perform a registration procedure with the IMS core. For example, the metaverse servers 220 and 230 may match and manage SIP-based information (e.g., phone numbers) for each user defined in the metaverse service. The call server 210 may include, for example, a metaverse agent configured to communicate with the metaverse servers 220 and 230, but the disclosure is not limited in this regard.

According to an embodiment, the electronic device 110 may establish an MSRP session with the metaverse servers 220 and 230, which may be referred to, for example, as a media session. The electronic device 110 may establish an MSRP session by exchanging an SIP-based message (e.g., an INVITE message and/or a 200 OK message, but is not limited thereto) with the metaverse servers 220 and 230, but the establishment method thereof is not limited thereto. Meanwhile, it will be understood by one of ordinary skill in the art that the media session may refer to a session capable of transmitting and receiving image data, for example an MSRP session, but is not limited thereto, and may be implemented as a call session for a voice call.

According to an embodiment, the electronic device 110 may establish a media session 241 with the first metaverse server 220. In the media session 241, e.g., an SIP entity (e.g., a phone number corresponding to the electronic device 110) for the electronic device 110 may be the caller, and an SIP entity (e.g., an IMS client defined corresponding to a first user 221) corresponding to a first user 221 of the first metaverse server 220 may be the receiver, or vice versa. Here, the first user 221 and/or the second user 231 may be an IMS client, but the disclosure is not limited in this regard.

For example, when the electronic device 110 is the caller, the electronic device 110 may transmit a message for establishing the media session 241 to the call server 210. In the existing MSRP, the message may include the caller's phone number. In the electronic device 110 according to an embodiment, instead of the caller's phone number, the message may include identification information about the first metaverse server 220 and user identification information in the metaverse service of the first metaverse server 220. For example, the user identification information may, for example, be identification information about the first user 221. The call server 210 may transmit the INVITE message to the first metaverse server 220 (or the IMS client corresponding to the first user 221) using the identification information about the first metaverse server 220 and the user identification information in the metaverse service of the first metaverse server 220. As is described below, for the privacy of the user of the electronic device 110, the call server 210 may convert the phone number corresponding to the electronic device 110 into an SIP account (e.g., an identifier of the first metaverse service and user identification information corresponding to the phone number) mapped to the phone number, or may transmit the converted INVITE message. In an example embodiment, the call server 210 may convert the phone number corresponding to the electronic device 110 included in the caller field (e.g., the "from" field) into user identification information corresponding to the phone number. In this case, the caller field (e.g., "from" field) of the message transmitted from the call server 210 to the metaverse server may include user identification information converted corresponding to the phone number corresponding to the electronic device 110, and/or the receiver field (e.g., "to" field) may include the phone number converted corresponding to the first user 221. Accordingly, a telephone service in a virtual space in which the actual phone number on the caller side is not exposed may be possible. In an example embodiment, the caller field (e.g., the "from" field) of the message transmitted from the call server 210 to the metaverse server may include the phone number corresponding to the electronic device 110, and/or the SIP account mapped to the corresponding phone number. For example, the receiver field (e.g., the "to" field) of the message may include the SIP account corresponding to the first user 221 and/or a converted phone number.

According to an embodiment, when the media session 241 is established between the electronic device 110 and the first user 221 of the first metaverse server 220, the electronic device 110 and the first metaverse server 220 may transmit and/or receive data through the media session 241. Meanwhile, the first metaverse server 220 may transmit and/or receive data to and/or from an external electronic device 201. The external electronic device 201 may access the first metaverse server 220 using, for example, user identification information about the first user 221 and/or authentication information (e.g., PIN and/or biometric information, but the disclosure is not limited in this regard) corresponding to the user identification information. The user of the external electronic device 201 may manipulate the first user 221 in the first metaverse service by manipulating the external electronic device 201. The first metaverse server 220 may provide data for representing a virtual space associated with the first user 221 to the external electronic device 201. The external electronic device 201 may provide data received from the first metaverse server 220 (e.g., display of a screen, output of a voice, and/or output of vibration, but the disclosure is not limited in this regard).

For example, the first metaverse server 220 may configure a virtual space including an object corresponding to data received from the electronic device 110 through the media session 241. Here, the object may be, for example, an image (or a video) captured by a camera module (including, e.g., a camera) of the electronic device 110, but is not limited thereto. For example, the object may be an image of a character generated based on a captured image, or an avatar in a virtual space. The object may be generated by the electronic device 110 or may be generated by the first metaverse server 220.

For example, the first metaverse server 220 may transmit data for representing a virtual space associated with the first user 221 to the electronic device 110 through the media session 241. The electronic device 110 may provide content including an object generated based on the received data (e.g., display of a screen, output of a voice, and/or output of vibration, but is not limited thereto). For example, a video call may be performed between the electronic device 110 and the first user 221. For example, referring to FIG. 2B, the electronic device 110 may display a virtual environment 251 including an avatar of the first user 221 (or a virtual environment near the avatar, a virtual environment at which the avatar gazes, and/or a designated virtual environment, but the disclosure is not limited in this regard) as a screen of the other party to the call, but the disclosure is not limited in this regard. For example, the electronic device 110 may also display a captured image 252. As described above, a video call may be performed between the electronic device 110 and the first user 221 of the first metaverse server 220. Meanwhile, the external electronic device 201 may display an image 253 captured by the electronic device 110 as a screen of the other party to the call, but the disclosure is not limited in this regard. For example, the external electronic device 201 may also display a virtual environment 254 together. The virtual environment 254 may be set to be the same as or different from the virtual environment 251 transmitted to the electronic device 201, and the setting is described below.

For example, the electronic device 110 may perform a video call with the second user 231 of the second metaverse server 230. The user may access the second metaverse server 230 using the identification information about the second user 231 by manipulating an external electronic device 203. At least part of the process of performing the video call with the second user 231 of the second metaverse server 230 may be the same as at least part of the process of performing the video call with the first user 221 of the first metaverse server 220, and the description thereof is not repeated here. The user of the external electronic device 203 may, for example, represent a virtual environment including a character generated based on an image captured by the electronic device 110 and/or an object including an avatar defined in a metaverse service corresponding to the electronic device 110. Since a video call between the electronic device 110 and the metaverse servers 220 and 230 may be performed based on, for example, an existing standard (e.g., SIP, IMS, MSRP, but not limited thereto) provided by the call server 210, the electronic device 110 may perform a video call with users of various metaverse servers 220 and 230.

For example, a media session 245 may be established between the first user 221 of the first metaverse server 220 and the second user 231 of the second metaverse server 230. As described above, the electronic device 110 may be the caller and the first user 221 may be the receiver, or vice versa. Accordingly, the electronic device 110 may be the receiver and the first user 221 may be the caller. As such, the first metaverse server 220 may provide a function of performing a call. The user of the external electronic device 201 may manipulate the external electronic device 201 to input a video call command to the second user 231 of the second metaverse server 230. The external electronic device 201 may transmit a video call request from the first user 221 to the second user 231 of the second metaverse server 230 to the first metaverse server 220. In this case, the first user 221 of the first metaverse server 220 may be the caller. The first metaverse server 220 may transmit, to the call server 210, a message (e.g., an INVITE message) for generating a call from the first user 221 to the second user 231 of the second metaverse server 230. The corresponding message may include the phone number of the second user 231, or may include identification information about the second metaverse service and identification information about the second user 231. The call server 210 may transmit the message to the second user 231 of the second metaverse server 230 using the information included in the message. The second user 231 may be the receiver. The second metaverse server 230 may transmit a message indicating that a call is requested to the external electronic device 203 corresponding to the second user 231. When a receive command is received from the external electronic device 203, the second metaverse server 230 may transmit a message (e.g., 200 OK) corresponding to the received message to the call server 210. The call server 210 may transmit the received message to the first user 221 of the first metaverse server 220. Accordingly, the media session 245 may be established between the first user 221 of the first metaverse server 220 and the second user 231 of the second metaverse server 230. Data may be transmitted and/or received through the media session 245. Since the media session 245 may be established based on existing standards, the operator may transmit and receive video calls, voice calls, and/or messages between heterogeneous metaverse servers 220 and 230.

For example, data for representing the virtual environment of the second metaverse server 230 associated with an avatar corresponding to the second user 231 may be transmitted to the first metaverse server 220. For example, referring to FIG. 2C, the external electronic device 201 may display a virtual environment 261 including an avatar of the second user 231 (or a virtual environment near the avatar, a virtual environment at which the avatar gazes, and/or a designated virtual environment, but is not limited thereto) as a screen of the other party to the call, but the disclosure is not limited in this regard. For example, the external electronic device 201 may also display the virtual environment 262 associated with the avatar of the first user 221 together, but the disclosure is not limited in this regard. The external electronic device 203 may display a virtual environment 263 including an avatar of the first user 221 (or a virtual environment near the avatar, a virtual environment at which the avatar gazes, and/or a designated virtual environment, but is not limited thereto) as a screen of the other party to the call, but the disclosure is not limited in this regard. For example, the external electronic device 203 may also display the virtual environment 264 associated with the avatar of the second user 231 together, but the disclosure is not limited in this regard.

For example, data for representing the virtual environment of the second metaverse server 230 associated with the avatar corresponding to the second user 231 may be transmitted to the first metaverse server 220. The first metaverse server 220 may generate data for representing that, for example, the avatar corresponding to the second user 231 is located in the virtual space of the first metaverse server 220 using the received data. The first metaverse server 220 may transmit the generated data to the external electronic device 201. The external electronic device 201 may represent content including an avatar corresponding to the second user 231 (or a virtual space of the second metaverse server 230 observed by the avatar) in the virtual space of the first metaverse server 220.

Figure 3:
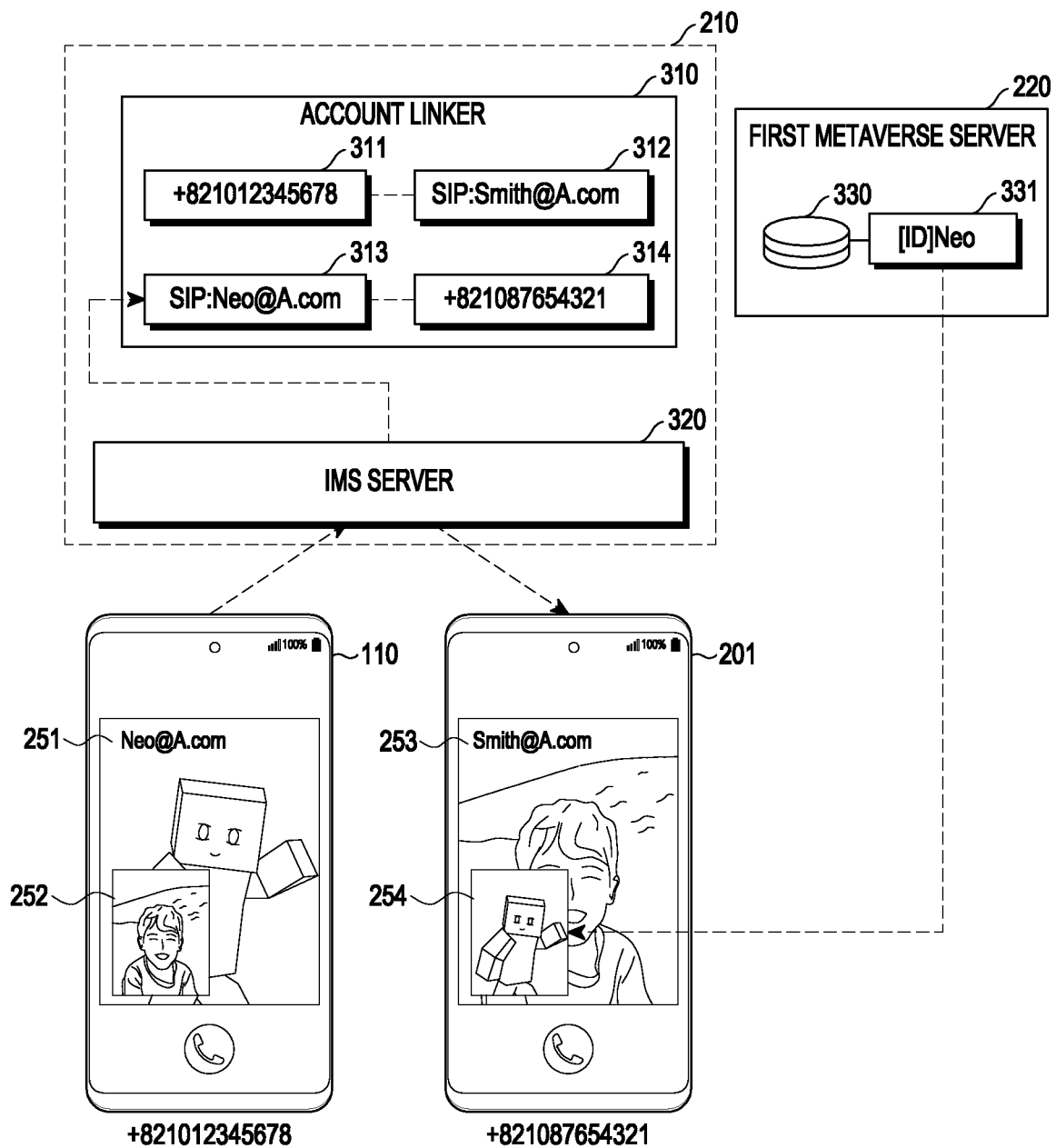
FIG. 3 is a view illustrating example operations of an electronic device, a call server, and a metaverse server according to an embodiment.

FIG. 3 is a view illustrating example operations of an electronic device, a call server, and a metaverse server according to an embodiment.

According to an embodiment, the call server 210 may include an account linker 310 and an IMS server 320. The account linker 310 may connect and store an SIP account and a phone number. For example, the domain of the first metaverse server 220 may be "A.com". As the user identification information about the first metaverse server 220, "Smith" and "Neo" may be registered. The account linker 310 may store the identification information about the metaverse service and the identification information about the user in the metaverse service together with "Smith@A.com" as the first SIP account 312, but this is by way of example and the expression method thereof is not limited thereto. The account linker 310 may connect and store a first phone number 311 (e.g., +821012345678) to the first SIP account 312. The account linker 310 may store the identification information about the metaverse service and the identification information about the user in the metaverse service together with "Neo@A.com" as the second SIP account 313. The account linker 310 may connect and store the second phone number 314 (e.g., +821087654321) to the second SIP account 313. Meanwhile, although not illustrated, the account linker 310 may store "Trinity@B.com" associated with a user of the second metaverse server 230 as a third SIP account. The account linker 310 may connect a third phone number to the third SIP account and store them.

According to an embodiment, the IMS server 320 may relay messages associated with the IMS and/or manage the media session (e.g., an MSRP session), but is not limited thereto. As described above, the IMS server 320 may establish a media session between the caller and the receiver, and may relay data between the caller and the receiver through a media session. For example, the electronic device 110 may be the caller, and the first user 221 (e.g., an IMS client corresponding to the first user 221) of the first metaverse server 220 may be the receiver. For example, the electronic device 110 may be the receiver, and the first user 221 of the first metaverse server 220 may be the caller. For example, the electronic device 110 may be the caller, and the second user 231 of the second metaverse server 230 may be the receiver. For example, the electronic device 110 may be the receiver, and the second user 231 of the second metaverse server 230 may be the caller. For example, the first user 221 of the first metaverse server 220 may be the caller, and the second user 231 of the second metaverse server 230 may be the receiver.

Meanwhile, referring to FIG. 3, the electronic device 110, as the caller, may request the IMS server 320 to generate a call with "Neo" of the first metaverse server 220. In this case, when "Neo" accesses the first metaverse server 220, the IMS server 320 may establish a media session using the electronic device 110 as the caller and "Neo" as the receiver. Meanwhile, "Neo" may be logged out of the first metaverse server 220. The call server 210 may identify that "Neo" is logged out of the first metaverse server 220, based on the interaction with the first metaverse server 220. In response, the call server 210 may identify the second phone number 314 connected to the second SIP account 313 corresponding to "Neo". The call server 210 may set the external electronic device 201 corresponding to the second phone number 314 as the receiver. The call server 210 may establish a media session using the electronic device 110 as the caller and the external electronic device 201 as the receiver. For example, the call server 210 may change information about the "to" field of the INVITE message from the second SIP account 313 to the second phone number 314. Meanwhile, the external electronic device 201 may configure the screen 254 to be used for the video call by referring to the data 331 corresponding to "Neo" stored in the database 330 of the first metaverse server 220, but the disclosure is not limited in this regard. As described above, when the electronic device 110 requests a video call for a specific user, the video call may be performed even when the corresponding user is logged out.

Figure 4A:
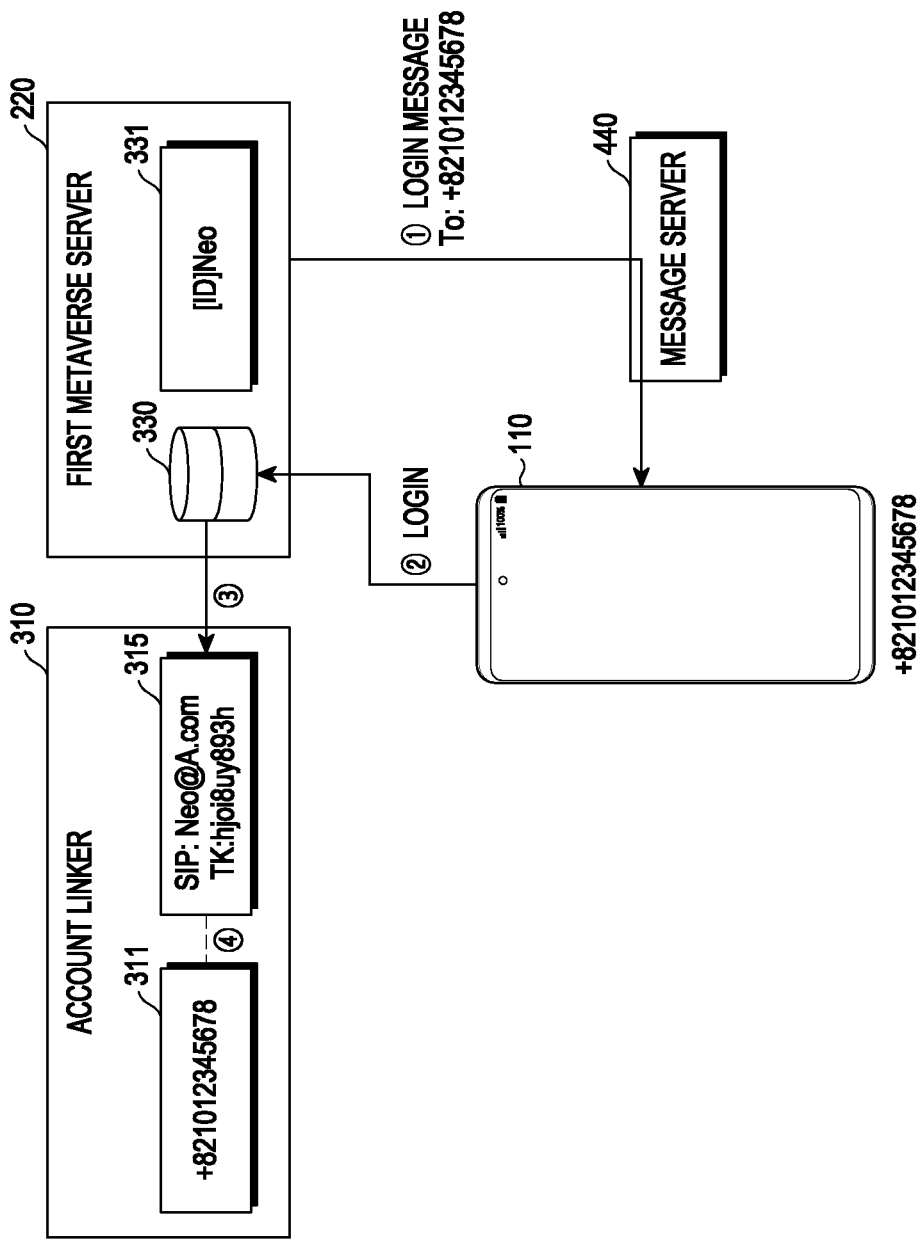
FIG. 4A is a view illustrating an example connection process of an SIP account according to an embodiment.
Figure 4B:
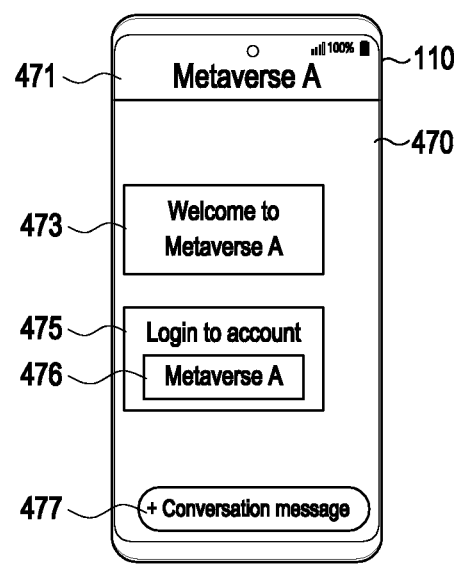
FIG. 4B illustrates an example screen for connection of an SIP account according to an embodiment.

FIG. 4A is a view illustrating an example connection process of an SIP account according to an embodiment. The embodiment of FIG. 4A is described with reference to FIG. 4B. FIG. 4B illustrates an example screen for logging in according to an embodiment.

According to an embodiment, the first metaverse server 220 may transmit a login message to the electronic device 110 through the message server 440. The transmission of the login message may be performed by, for example, a chatbot (e.g., the chatbot 401 of FIG. 4C) executed by the first metaverse server 220, but the disclosure is not limited in this regard. Based on the reception of the login message, the electronic device 110 may display a screen 470 (see FIG. 4b) for login, based on the login message. The screen 470 may be, for example, a screen of a message application. The screen 470 may include a tab 471 displaying identification information for the other party to the call, and the tab 471 may include identification information (e.g., "Metaverse A") corresponding to the first metaverse server 220. The screen 470 may include objects 473 and 475 corresponding to messages transmitted and received with the other party. For example, the object 475 may include a function key 476 for logging in to the first metaverse server 220. The screen 470 may include an input window 477 for inputting a conversation message. When input window 477 is designated, a virtual keyboard may be invoked. Based on the designation of the function key 476, the electronic device 110 may transmit a message for login to the first metaverse server 220. The first metaverse server 220 may log in to the corresponding user account based on reception of the message for login. The first metaverse server 220 may provide the login result to the account linker 310. The login result may include a phone number, an SIP account, and/or a token for access, but is not limited thereto. The account linker 310 may store and/or manage the phone number 314 and the corresponding SIP account and token 315 based on the received login result. According to the above-described process, the correspondence relationship between the phone number, the SIP account, and/or the token for access may be stored and/or managed in the account linker 310, but the disclosure is not limited in this respect.

Figure 4C:
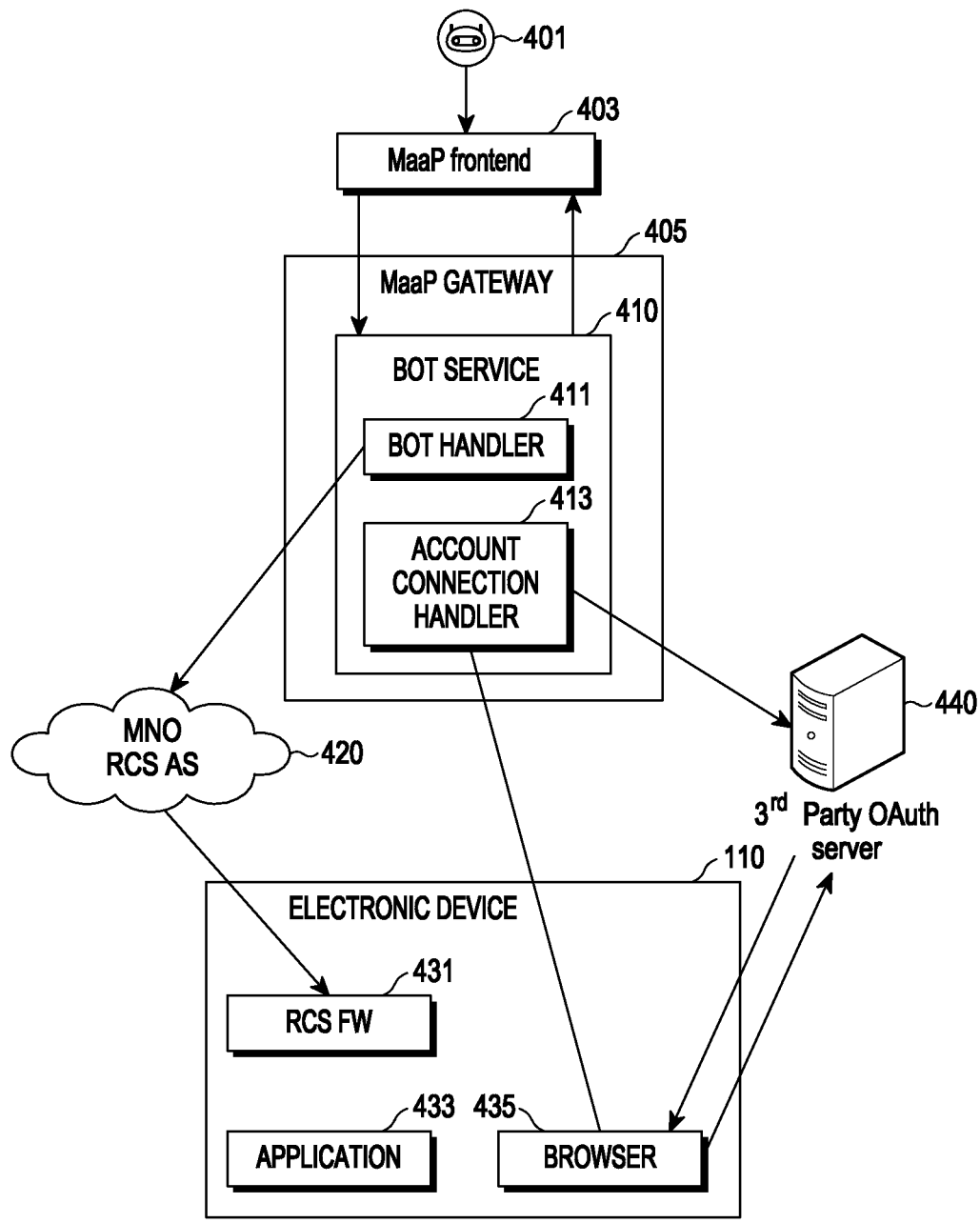
FIG. 4C is a view illustrating an example connection process of an SIP account according to an embodiment.

FIG. 4C is a view illustrating an example connection process of an SIP account according to an embodiment.

According to an embodiment, the chatbot 401 may request a Messaging as a Platform (MaaP) frontend 403 to connect between an SIP account and a phone number. The chatbot 401 may operate on, for example, a metaverse server, but the disclosure is not limited in this regard. For example, when a new user subscribes to the metaverse server, the metaverse server may obtain (or receive) the user identification information and the phone number, but this is by way of example and the time point at which the information is obtained is not limited.

According to an embodiment, the MaaP front end 403 may transmit, to the MaaP gateway 405, a login message for requesting connection between the SIP account and the phone number. For example, the traffic type of the login message may be "account_linking". The MaaP gateway 405 may support, for example, a bot service 410. The bot service 410 may include a bot handler 411. The bot handler 411 may modify the login message. For example, the bot handler 411 may replace the login URL. For example, the bot handler 411 may add a client identifier client_id. For example, the bot handler 411 may add a URL (redirect_url) for redirection. For example, the bot handler 411 may transmit the modified login message to the MNO RCS application server (AS) 420. The modified login message may be provided to the electronic device 110 through the mobile network operator (MNO) RCS AS 420.

According to an embodiment, the RCS FW 431 operating in the electronic device 110 may receive the modified login message from the MaaP gateway 405 through the MNO RCS AS 420. The modified login message may be provided to the application 433 through the RCS FW 431. The application 433 may open the login URL through the browser 435 based on the modified login message. The browser 435 may provide the user ID and the password to the third party OAuth server 440. The third party OAuth server 440 may provide a result including a code, a state, and/or a URL (redirect_url) for redirection to the browser 435. The browser 435 may provide the received result to the account connection handler 413 of the MaaP gateway 405. The account connection handler 413 may generate an access token including a code and/or a state, based on an interaction with the third party OAuth server 440. The MaaP gateway 405 may provide the webhook message including the header of an access token to the MaaP front end 403.

Figure 5:
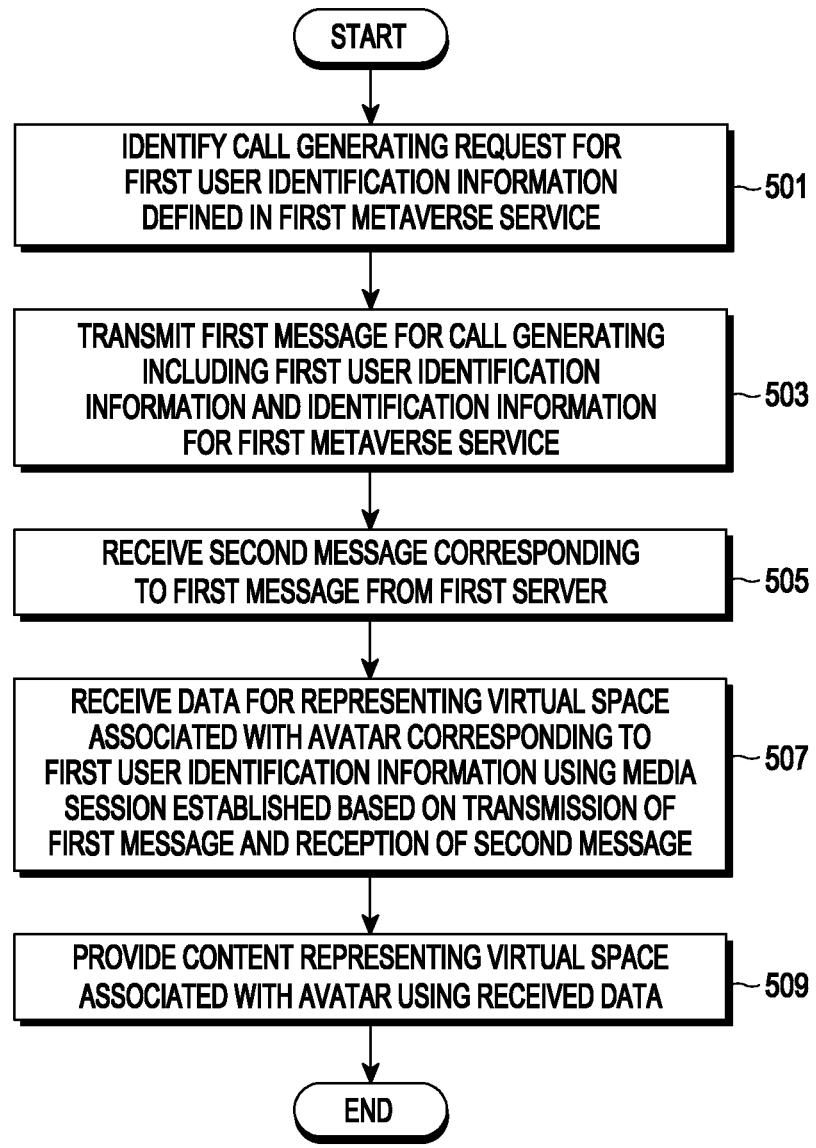
FIG. 5 is a flowchart illustrating an example operation method of an electronic device according to an embodiment.

FIG. 5 is a flowchart illustrating an example operation method of an electronic device according to an embodiment.

According to an embodiment, in operation 501, the electronic device 110 (e.g., the processor 111 of FIG. 1) may identify a call generating request for first user identification information defined in the first metaverse service. In operation 503, the electronic device 110 may transmit, to a first server (e.g., the call server 210 of FIG. 2), a first message for call generation including identification information about the first metaverse service and first user identification information. For example, the electronic device 110 may store the identification information about the first metaverse service (or metaverse server) and the first user identification information as contact information for the first user. The electronic device 110 may, for example, store contact information about various users in a contact management application or a telephone application. For some of these users, the identification information about the metaverse service (or the metaverse server) and the user identification information in the metaverse service may be stored as contact information instead of (or in addition to) the phone number. When the video call connection command for the corresponding user is identified (e.g., a touch of the video call icon, but the disclosure is not limited in this regard), the electronic device 110 may transmit the first message including the identification information about the first metaverse service (or metaverse server) and the first user identification information (to the corresponding metaverse server as the receiver). Meanwhile, for some users, phone numbers may be stored as contact information. When the video call connection command for the corresponding user is identified (e.g., a touch of the video call icon), the electronic device 110 may transmit a first message including the corresponding phone number (to the device of the corresponding phone number as the receiver). Meanwhile, for some users, the phone number, identification information about the metaverse service (or the metaverse server), and user identification information in the metaverse service may be stored as contact information. When the video call connection command for the corresponding user is identified (e.g., a touch of the video call icon), the electronic device 110 may inquire about whether to generate a video call for the corresponding phone number or whether to generate a video call for the metaverse user. In this case, when it is identified that the phone number is selected, the electronic device 110 may transmit a first message including the phone number. Alternatively, when the selection of the metaverse user is identified, the electronic device 110 may transmit a first message including identification information about the metaverse service (or metaverse server) and user identification information in the metaverse service. Meanwhile, this is by way of example, and in addition to user selection, a method of selecting any one of the two may be implemented in various ways.

According to an embodiment, in operation 505, the electronic device 110 may receive a second message corresponding to the first message from a first server (e.g., the call server 210). In operation 507, the electronic device 110 may receive data for representing a virtual space associated with an avatar corresponding to the first user identification information, using the media session established based on the transmission of the first message and the reception of the second message. For example, when the first message includes identification information about the first metaverse service (or metaverse server) and identification information about the first user, the first server (e.g., call server 210) may transmit, to the metaverse server, a message having the first user of the metaverse server as the receiver. The metaverse server may receive a message using the first user as the receiver. The metaverse server may transmit the second message to the first server (e.g., the call server 210) in response thereto. The metaverse server may be configured to, for example, after inquiring about whether to receive a call to a device corresponding to the first user, transmit a second message when a call reception response to the inquiry is identified, but the disclosure is not limited in this regard. Meanwhile, those skilled in the art will understand that in addition to the first message and the second message, for example, an additional message required by the IMS may be transmitted and/or received. In operation 509, the electronic device 110 may provide content representing a virtual space associated with the avatar, using the received data. For example, an image (e.g., a selfie) captured by the electronic device 110 may be displayed together with the virtual space associated with the avatar, but the disclosure is not limited in this regard.

Figure 6:
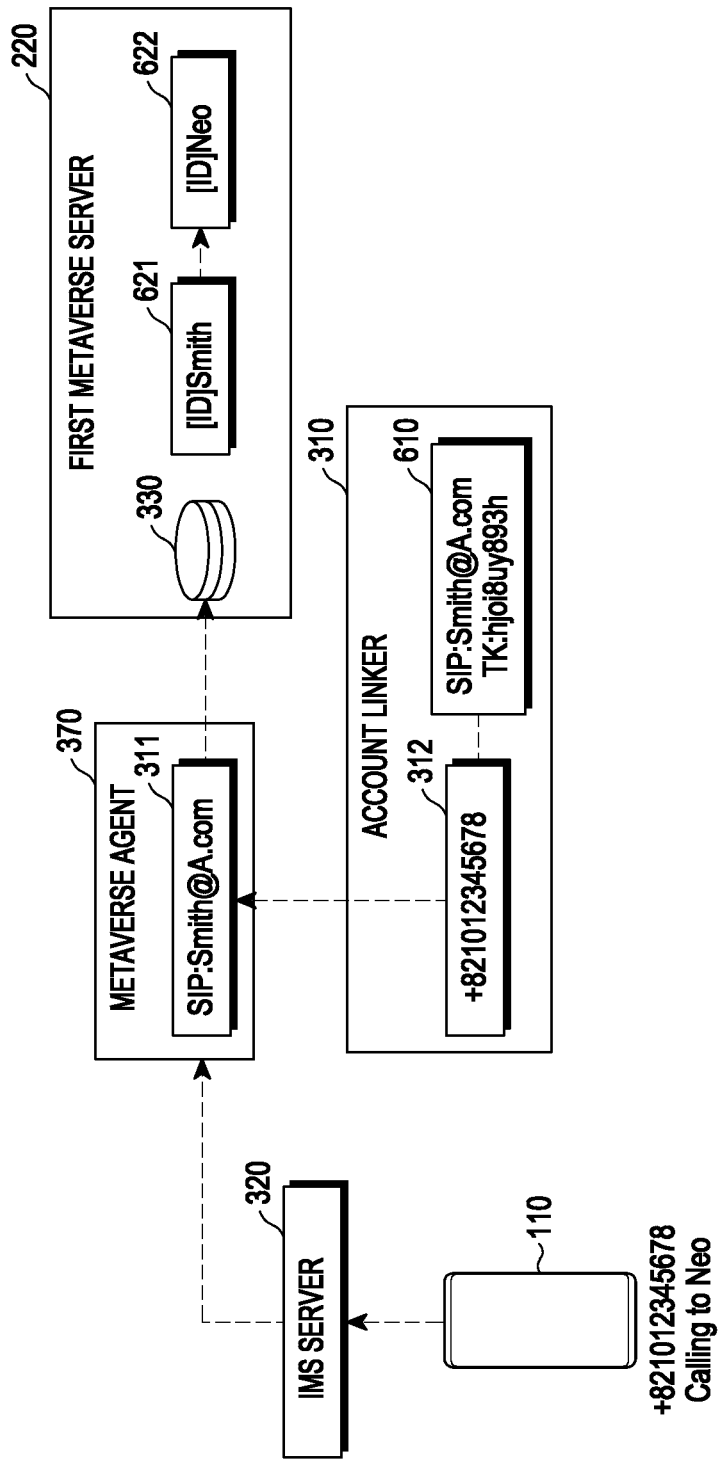
FIG. 6 is a diagram illustrating an example operation method of an electronic device, a call server, and a metaverse server according to an embodiment.

FIG. 6 is a diagram illustrating an operation method of an electronic device, a call server, and a metaverse server according to an embodiment.

According to an embodiment, the call server (e.g., the call server 210) may include an account linker 310, an IMS server 320, and/or a metaverse agent 370. For example, the electronic device 110 may request a video call from a first user (e.g., "Neo") of the first metaverse service (e.g., "A.com"). The phone number corresponding to the electronic device 110 may be, e.g., "+82012345678". The IMS server 320 may receive a message for requesting a video call from the electronic device 110. The IMS server 320 may provide a message for requesting a video call to the metaverse agent 370. The message for the video call request may include, e.g., information about the receiver side (e.g., a first user (e.g., "Neo") of the first metaverse service (e.g., "A.com")) and information about the caller side (e.g., the phone number "+82012345678"). The metaverse agent 370 may identify, from the account linker 310, that the SIP account "Smith@A.com" and the corresponding token (e.g., hjoi8uy893h) 610 are connected to the phone number 312 of "+82012345678", which is information about the caller side. The metaverse agent 370 may notify the first metaverse server 220 corresponding to "A.com", which is the identification information about the metaverse, that "Smith@A.com" 311 of the caller side requests a video call from "Neo@A.com" of the receiver side. For example, the INVITE message in which the phone number (+821012345678) included in the "from" field has been changed into the SIP account Smith@A.com may be transmitted to the first metaverse server 220. For example, the first metaverse server 220 may receive the INVITE message including the caller's SIP account in the "from" field and the receiver's SIP account in the "to" field. For the corresponding video call, the identified token (e.g., hjoi8uy893h) may be used. The first metaverse server 220 may generate and/or manage that the user 621 of Smith requests a video call from the user 622 of Neo in the metaverse service by using the database 330.

Figure 7:
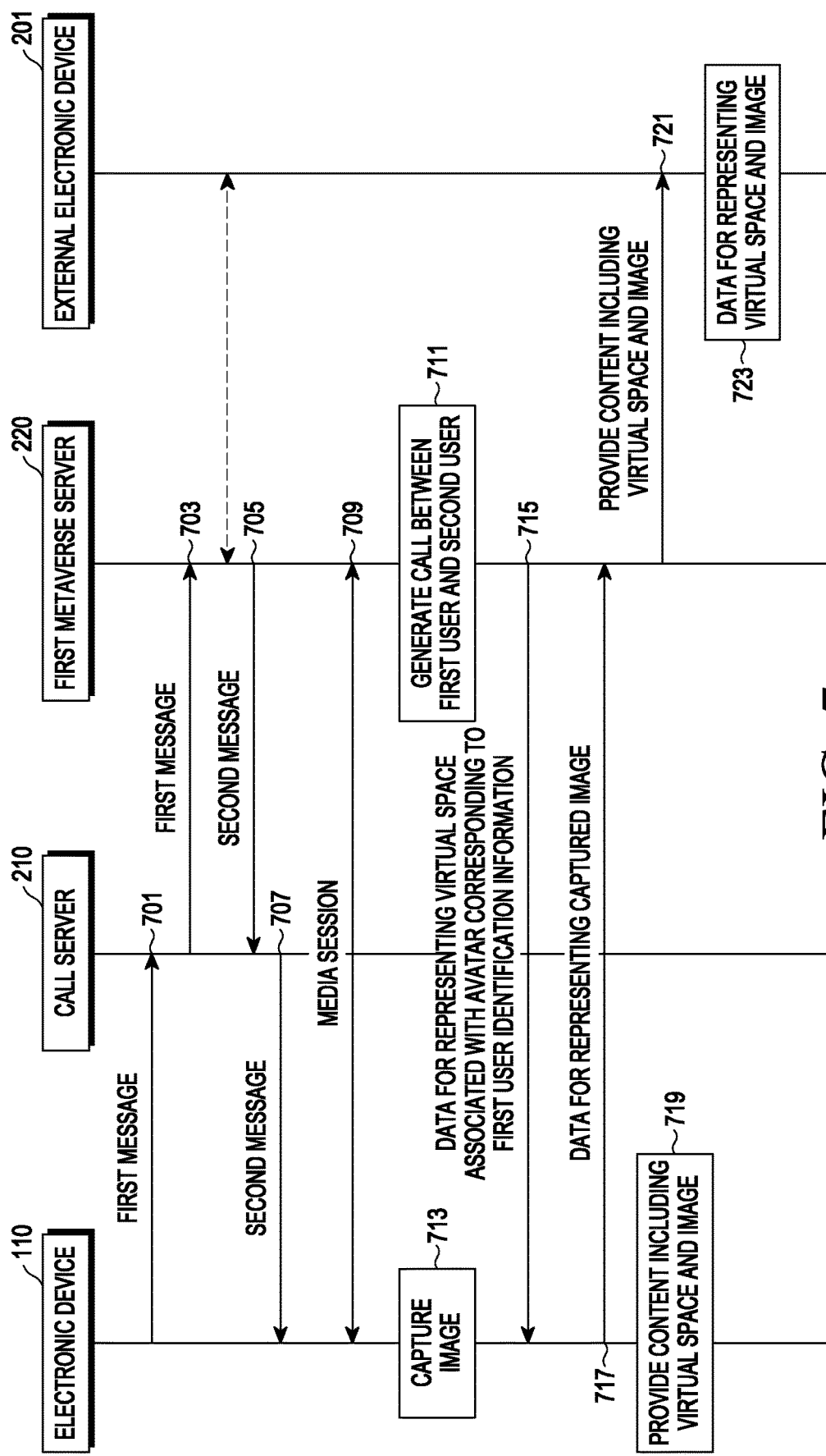
FIG. 7 is a flowchart illustrating an example operation method of an electronic device, a call server, and a metaverse server according to an embodiment.

FIG. 7 is a flowchart illustrating an example operation method of an electronic device, a call server, and a metaverse server according to an embodiment.

According to an embodiment, in operation 701, the electronic device 110 (e.g., the processor 111 of FIG. 1) may transmit a first message including identification information about a first metaverse service (or the first metaverse server 220) and identification information about a first user defined in the first metaverse service to the call server 210. Based on the first message, the call server 210 may identify that it is requested to generate a call using the electronic device 110 as the caller and the first user of the first metaverse server 220 as the receiver. In operation 703, the call server 210 may transmit the first message to the first metaverse server 220 corresponding to the caller. As described above, the phone number corresponding to the electronic device 110 in the from field of the first message may be changed to the SIP account corresponding to the caller. The first metaverse server 220 may identify that a call is requested from the electronic device 110 to the first user, based on the received first message. For example, the first metaverse server 220 may identify that the user account corresponding to the caller requests a call from the user account corresponding to the caller, based on the SIP account included in the "from" field. The first metaverse server 220 may transmit a second message corresponding to the first message to the call server 210 in operation 705. For example, the first metaverse server 220 may notify the external electronic device 201 corresponding to the first user that a call is requested, and may transmit the second message to the call server 210 when the response is received from the external electronic device 201, but this is merely an example, and the transmission event of the second message is not limited thereto. The call server 210 may transmit the second message to the electronic device 110 in operation 707. Based on transmission/reception of the first message and the second message, a media session 709 (e.g., an MSRP session) may be established between the electronic device 110 and the first metaverse server 220 (e.g., a first user of the first metaverse service).

According to an embodiment, in operation 711, the first metaverse server 220 may generate a call between the first user and the second user (e.g., the user corresponding to the phone number of the electronic device 110). It will be understood by one of ordinary skill in the art that the first metaverse server 220 may be intended to manage a call in the metaverse service, and this may be omitted. In operation 713, the electronic device 110 may capture an image using a camera module including a camera. For example, while the electronic device 110 performs a video call, an image captured by the electronic device 110 should be transmitted, and thus an image may be captured using the camera module. However, capturing of an image is merely an example, and it will be understood by one of ordinary skill in the art that a screen (e.g., the character or a screen corresponding to the second user in the first metaverse service) replacing the image may be transmitted, and the image may be replaced. In operation 715, the first metaverse server 220 may transmit data for representing a virtual space associated with the avatar corresponding to the first user identification information to the electronic device 110 through the media session 709. In operation 717, the electronic device 110 may transmit data for representing the captured image to the first metaverse server 220 through the media session 709. In operation 719, the electronic device 110 may provide, for example, content including a virtual space generated based on the received data and a captured image as illustrated in FIG. 2B. In operation 721, the first metaverse server 220 may transmit data for representing the virtual space and the received image to the external electronic device 201 corresponding to the first user. In operation 723, the external electronic device 201 may provide content including the virtual space and an image, e.g., as shown in FIG. 2B, based on the received data. As described above, data for representing the metaverse service associated with the first user and data captured by the electronic device 110 may be transmitted and received through the media session 709, and the external electronic device 201 connected for the metaverse service may perform transmission and reception through another session (e.g., PDU session) established between the metaverse server 220 and the external electronic device 201.

Figure 8:
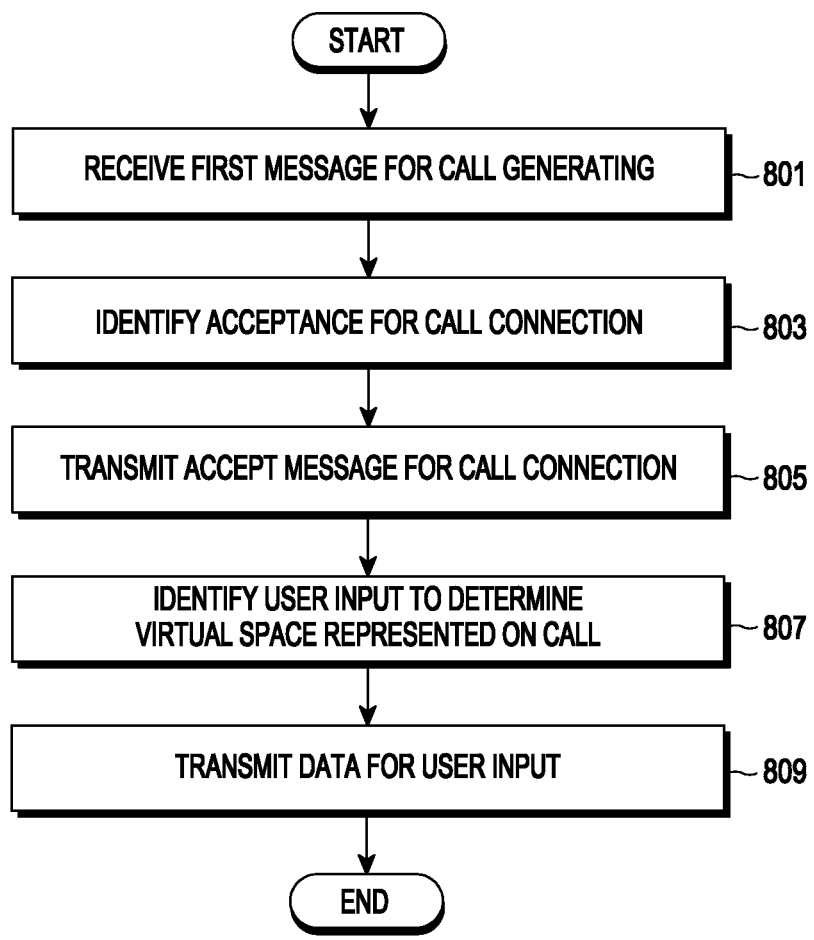
FIG. 8 is a flowchart illustrating an example operation method of an electronic device connected to a metaverse server according to an embodiment.
Figure 9A:
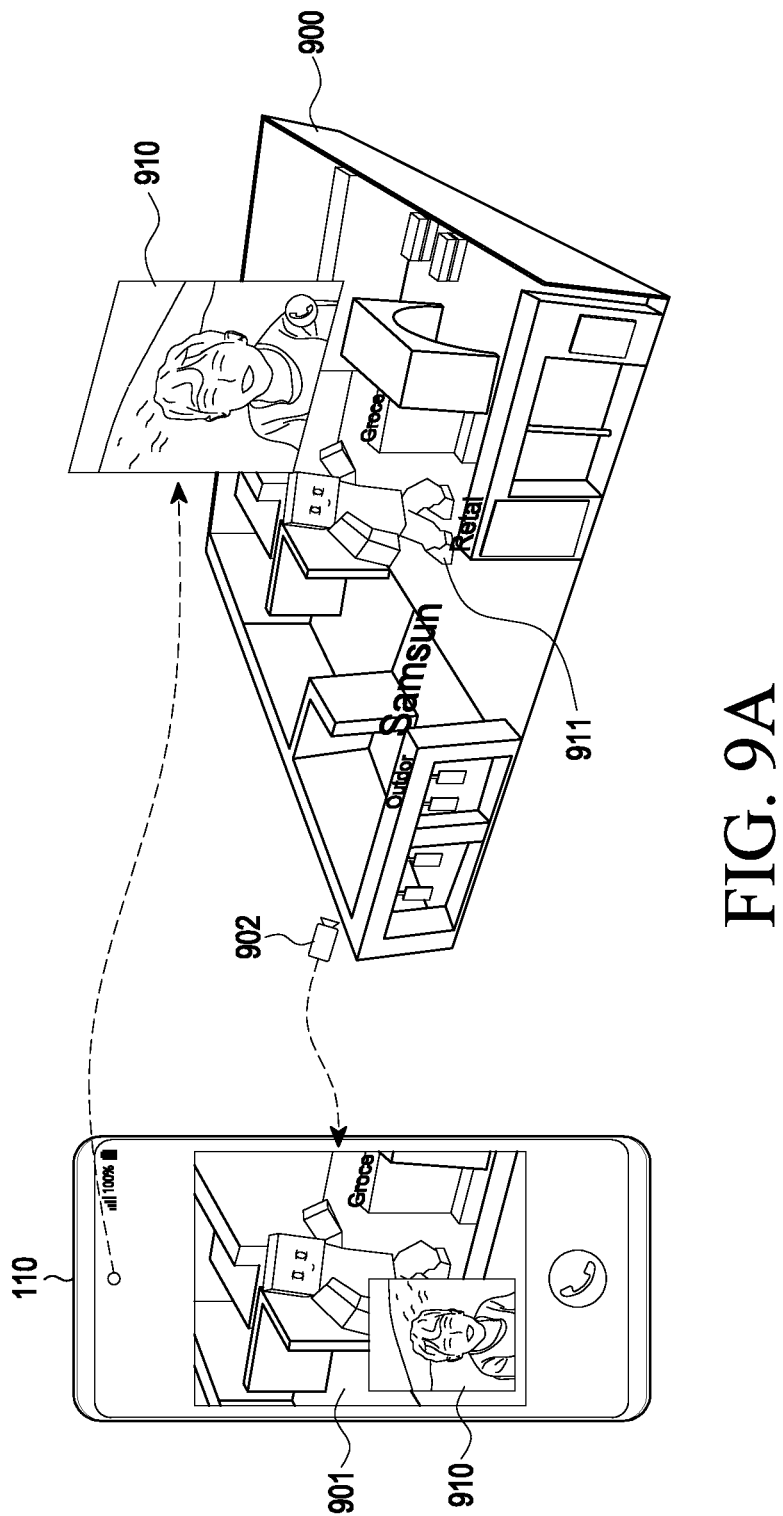
FIG. 9A is a view illustrating an example virtual environment portion transmitted according to an embodiment.
Figure 9B:
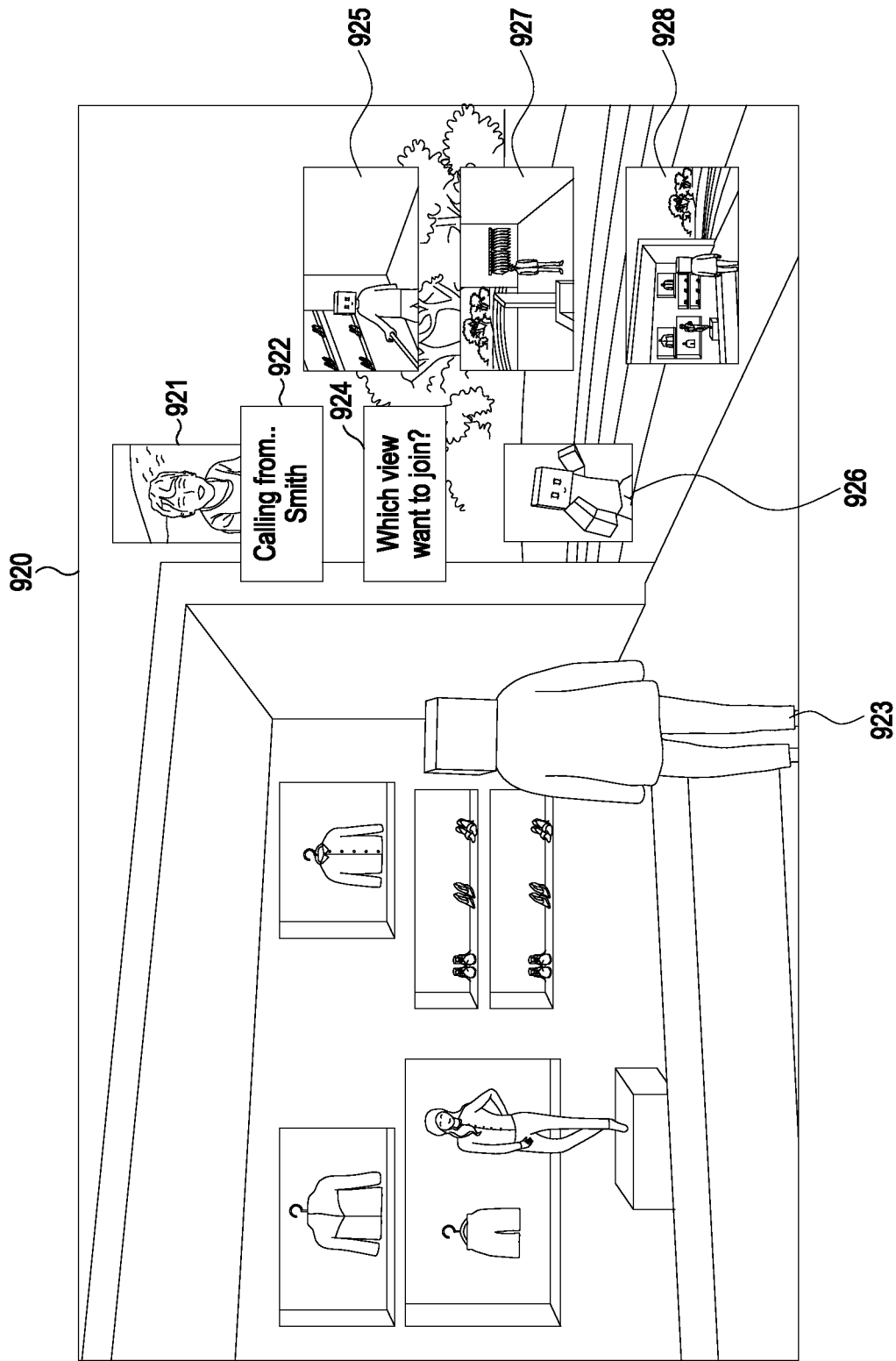
FIG. 9B is a view illustrating example adjustment of a virtual environment portion transmitted according to an embodiment.
Figure 9C:
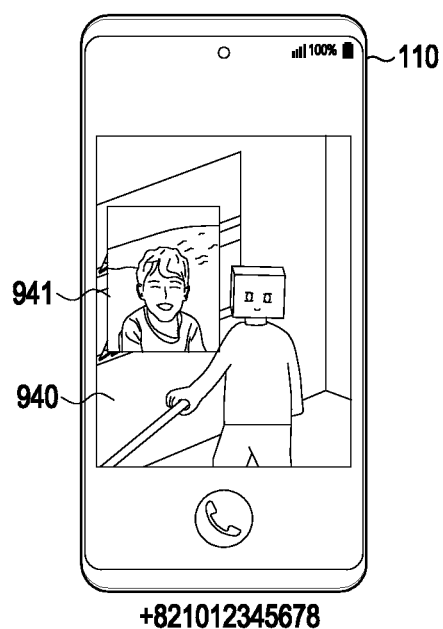
FIG. 9C is a view illustrating an example screen displayed on an electronic device according to an embodiment.

FIG. 8 is a flowchart illustrating an example operation method of an electronic device connected to a metaverse server according to an embodiment. Although the operations of FIG. 8 are described as being performed by the external electronic device 201 connected to the first metaverse server 220 of FIG. 2A, those skilled in the art will understand that at least some of the corresponding operations may also be performed by the electronic device 110. The electronic device 110 may also access the metaverse server and may perform the operations described with reference to FIG. 8 while in connection with the metaverse server. The embodiment of FIG. 8 is described with reference to FIGS. 9A, 9B, and 9C. FIG. 9A is a view illustrating an example virtual environment portion transmitted according to an embodiment. FIG. 9B is a view illustrating adjustment of an example virtual environment portion transmitted according to an embodiment. FIG. 9C is a view illustrating an example screen displayed on an electronic device according to an embodiment.

According to an embodiment, in operation 801, the external electronic device 201 may receive a first message for generating a call. In FIG. 7, it has been described that the first metaverse server 220 receives, for example, an SIP-based message. Rather than transmitting the SIP-based message to the external electronic device 201 as it is, the first metaverse server 220 may transmit the first message defined in the metaverse service, indicating that the user of the electronic device 110 has requested a call, to the external electronic device 201. However, this is an example, and, in another example, the first metaverse server 220 may transmit the SIP-based message. The first message may include information about the user of the electronic device 110, for example, the subject that has generated the call. The corresponding information may be expressed as a phone number and/or as identification information corresponding to a phone number in the metaverse service.

According to an embodiment, the external electronic device 201 may identify acceptance of the call connection in operation 803. For example, the external electronic device 201 may display a UI indicating that a call is requested, based on reception of the first message. The configuration of the UI may be performed by the first metaverse server 220 or may be performed by the external electronic device 201, and the disclosure is not limited in this regard. The external electronic device 201 may receive a user command through the corresponding UI. In operation 805, the external electronic device 201 may transmit a call connection accept message to the first metaverse server 220. As described above, the transmission/reception of the first message and/or the accept message may be performed through a session (e.g., PDU session) established between the external electronic device 201 and the first metaverse server 220. Upon receiving the accept message, the first metaverse server 220 may transmit an SIP-based accept message (e.g., 200 OK) to the electronic device 110. Accordingly, a media session (e.g., an MSRP session) may be established between the electronic device 110 and the first metaverse server 220.

According to an embodiment, in operation 807, the external electronic device 201 may identify a user input for determining the virtual space represented in the call. In operation 809, the external electronic device 201 may transmit data on the user input to the first metaverse server 220. For example, referring to FIG. 9A, the electronic device 110 may provide content 901 based on data transmitted by the first metaverse server 220. For example, the image 910 captured by the electronic device 110 may also be displayed together. In the virtual space 900 associated with the avatar 911 of the first user configured by the metaverse service, a virtual camera 902 for determining (or adjusting) a portion to be transmitted may be defined. For example, a portion of the virtual space 900 corresponding to the angle of view of the virtual camera 902 may be determined as a portion to be transmitted to the electronic device 110. In an example embodiment, a user input for adjusting a portion captured by the external electronic device 201 and the virtual camera 902 may be obtained (or received). For example, the user of the external electronic device 201 may provide a UI for displaying a portion of the virtual space 900, and may obtain a user input through the UI. The external electronic device 201 may transmit a user input to the first metaverse server 220. The first metaverse server 220 may change a portion of the virtual space 900 to be transmitted to the electronic device 110 through the media session, based on a user input.

In an embodiment, the external electronic device 201 may provide a UI 920 for selecting a transmitted screen as illustrated in FIG. 9B. The UI 920 according to an embodiment may include information 921 and 922 associated with the user requesting the call. For example, the UI 920 may include an image 921 corresponding to the user requesting a call and/or information for identifying the corresponding user (e.g., identification information about the corresponding user defined in the metaverse service and/or a phone number). The UI 920 according to an embodiment may include a text pop-up 924 for requesting to select a transmitted screen and candidates 925, 926, 928, and 928 for the transmitted screen. The text pop-up 924 may include text indicating that any one of the candidates 925, 926, 927, and 928 is required to be selected. The first candidate 925 may be represented as, for example, a three-dimensional screen of a composition in which the first avatar takes a selfie. The second candidate 926 may be represented as, for example, a two-dimensional screen in which the front of the first avatar is photographed. The third candidate 927 may be represented as, for example, a screen in which a portion of the virtual space in a composition in which the first avatar is viewed from a relatively upper view. The fourth candidate 928 may be represented as, for example, a screen in a composition viewed by the first avatar. Meanwhile, it is merely by way of example that the first avatar is included in the candidates 925, 926, 927, and 928, and some of the candidates may be expressed not to include the first avatar. The user of the external electronic device 201 may input a user input for selecting any one of the candidates 925, 926, 927, and 928. The external electronic device 201 may transmit a user input to the first metaverse server 220. The first metaverse server 220 may define a portion of the virtual space transmitted to the electronic device 110, based on the received user input, and may generate data for representing the portion. The first metaverse server 220 may transmit the generated data to the electronic device 110. For example, it is assumed that the external electronic device 201 has identified the selection of the first candidate 925. The first metaverse server 220 may generate data in such a composition in which the first avatar takes a selfie, based on selection of the first candidate 925. The first metaverse server 220 may transmit the generated data to the electronic device 110. As shown in FIG. 9C, the electronic device 110 may display the portion 941 of the virtual space and the captured image 940 as a screen of the video call, based on the received data. The portion 941 of the virtual space may be expressed in a composition in which the first avatar takes a selfie, as configured by the first metaverse server 220. As described above, according to an embodiment, the user of the metaverse service may select and/or adjust a screen represented in the video call.

Figure 10:
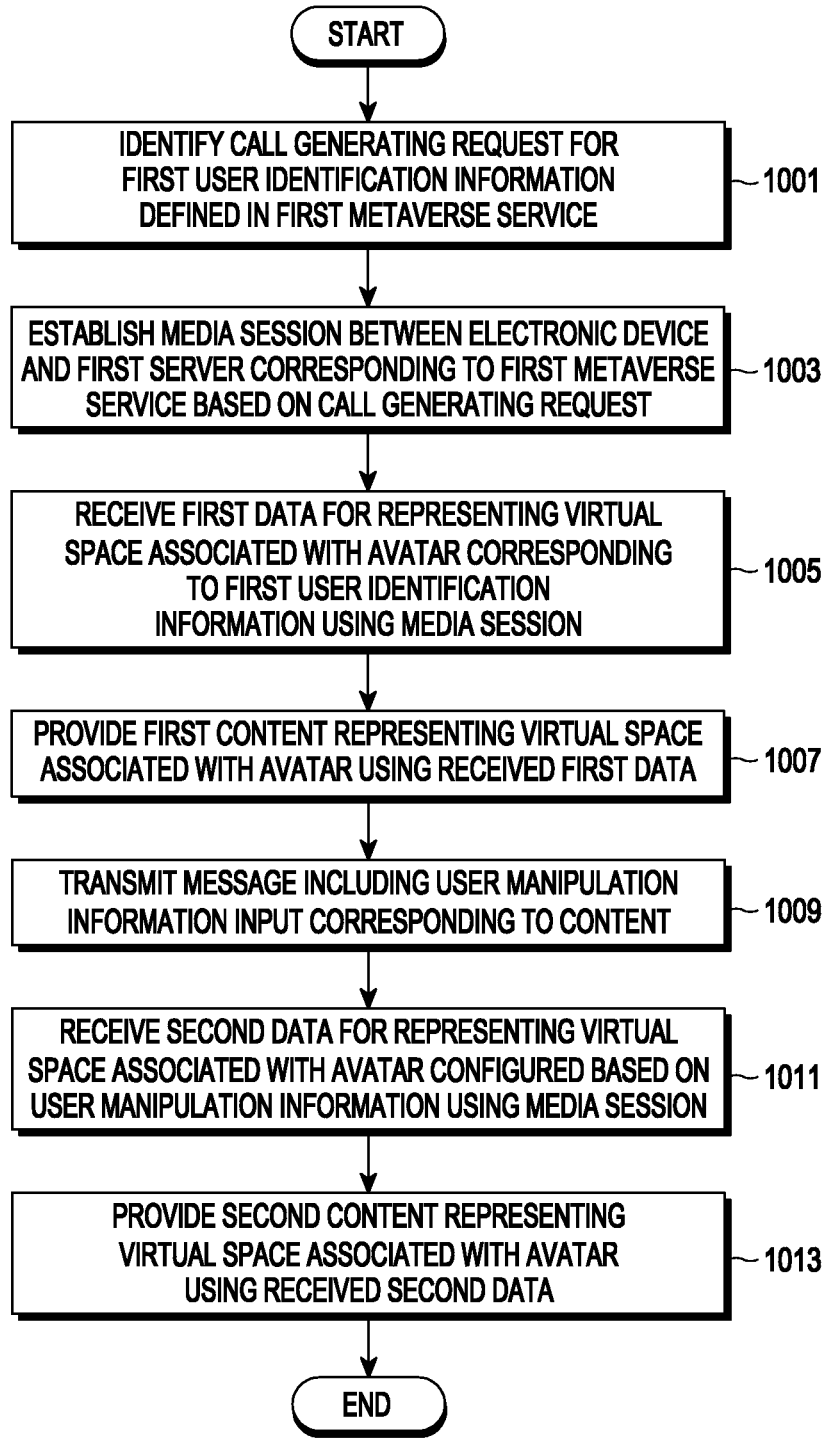
FIG. 10 is a flowchart illustrating an example operation method of an electronic device according to an embodiment.
Figure 11:
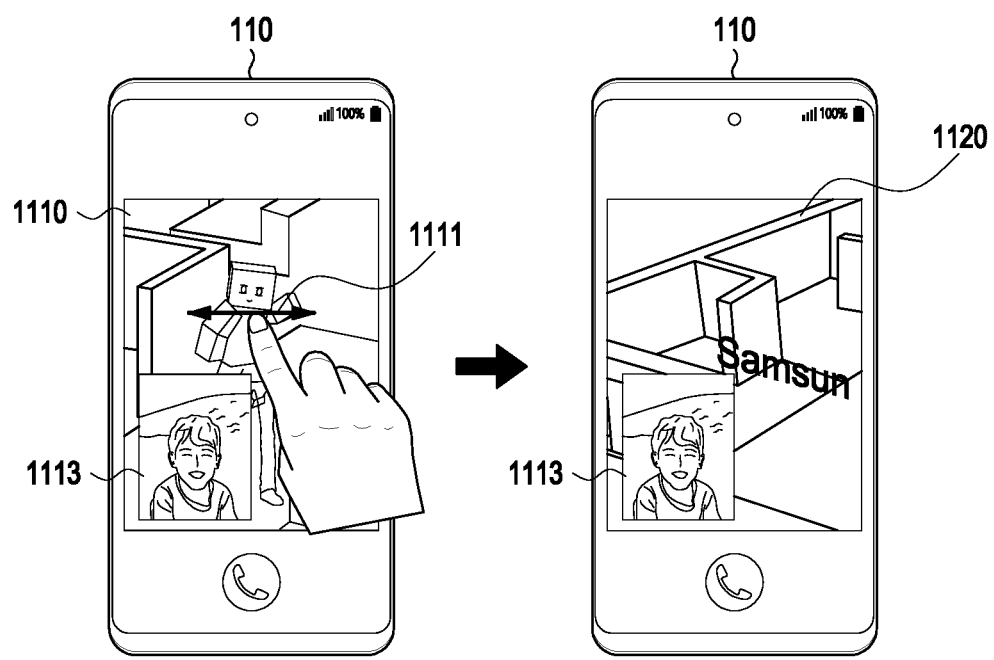
FIG. 11 is a view illustrating example adjustment of a portion displayed by the other party according to an embodiment.

FIG. 10 is a flowchart illustrating an example operation method of an electronic device according to an embodiment. The embodiment of FIG. 10 is described with reference to FIG. 11. FIG. 11 is a view illustrating example adjustment of a portion displayed by the other party according to an embodiment.

According to an embodiment, in operation 1001, the electronic device 110 (e.g., the processor 111 of FIG. 1) may identify a call generating request for the first user identification information defined in the first metaverse service. For example, the electronic device 110 may display an execution screen of a phone application or an execution screen of a contact application. The execution screen of the phone application or the execution screen of the contact application may include contact-related information about at least one user. Among the contacts of the at least one user, for example, the contact-related information about the first user may include identification information about the metaverse service and identification information about the user in the metaverse service. The electronic device 110 may identify a call generating request (e.g., a touch of an icon for a call (or video call) or a call request command through a voice assistant) for the first user. In operation 1003, the electronic device 110 may establish a media session between the electronic device 110 and a first server (e.g., the first metaverse server 220) corresponding to the first metaverse service, based on the call generating request.

According to an embodiment, in operation 1005, the electronic device 110 may receive first data for representing the virtual space associated with the avatar corresponding to the first user identification information, using the media session. For example, as shown in FIG. 11, in operation 1007, the electronic device 110 may provide the first content 1110 representing the virtual space associated with the avatar using the received first data. Along with the first content 1110, an image 1113 captured by the electronic device 110 may also be provided. For example, the first data initially transmitted to the electronic device 110 may be a composition defined as a default by a first server (e.g., the first metaverse server 220), or may be generated based on a composition set based on a user input in the external electronic device 201 described with reference to FIG. 9A or 9B, but is not limited thereto.

Referring back to FIG. 10, according to an embodiment, in operation 1009, the electronic device 110 may transmit the message including user manipulation information input corresponding to the content to the first server (e.g., the first metaverse server 220). For example, as shown in FIG. 11, a swipe 1111 for the electronic device 110 may be identified as user manipulation information. A viewpoint for the virtual space may be manipulated according to the direction of the swipe 1111. For example, based on a left swipe, the viewpoint of viewing the virtual space may be moved (or changed) relatively to the left (or counterclockwise), but this is merely an example. It will be understood by one of ordinary skill in the art that, in addition to changing the viewpoint, operations such as enlarging or shrinking may be performed according to user operation information such as pinch-out or pinch-in. The electronic device 110 may transmit information about the swipe 1111 or may transmit information for requesting a function (e.g., a function of changing a viewpoint) corresponding to the swipe 1111. A method in which the electronic device 110 transmits a message including user manipulation information to the first server is described with reference to FIGS. 12 and 13. In operation 1011, the electronic device 110 may receive second data for representing a virtual space associated with the avatar set based on the user manipulation information, using the media session. In operation 1013, the electronic device 110 may provide the second content 1120 representing the virtual space associated with the avatar using the received second data, for example, as shown in FIG. 11. The second content 1120 may relate to a scene in which the virtual space is viewed from a viewpoint different from that of the first content 1110, but the disclosure is not limited in this regard. As described above, while the video call is performed, the electronic device 110 may request the first server (e.g., the first metaverse server 220) to transmit another portion of the virtual space, and may receive and provide data for the other portion of the virtual space in response thereto. For example, when the first user of the metaverse service permits viewpoint change for the virtual space, the above-described function may be provided, but this is merely an example, and the above-described function may be provided regardless of the viewpoint change permission.

Figure 12:
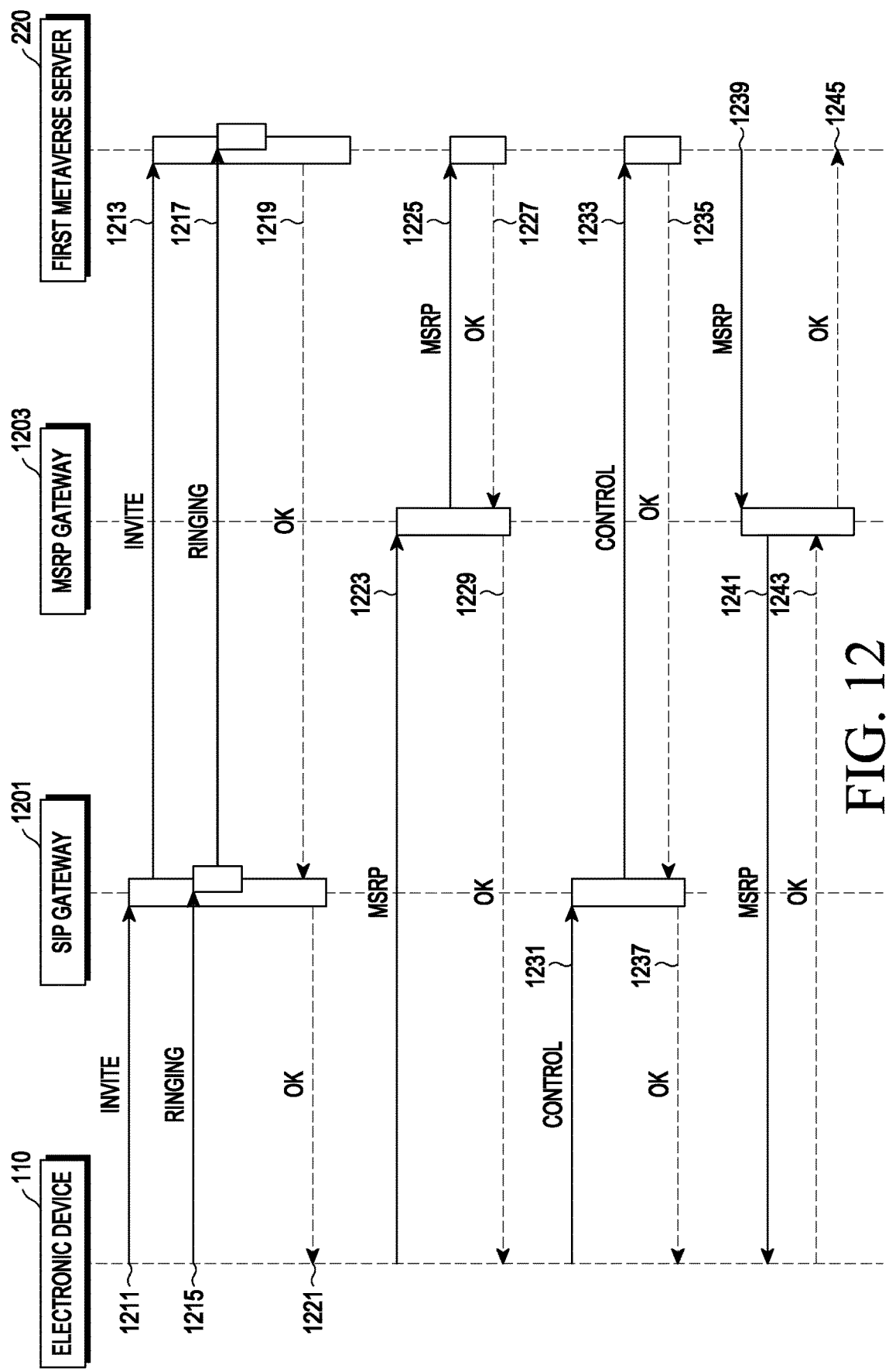
FIG. 12 is a flowchart illustrating example operations of an electronic device, gateways, and a metaverse server according to an embodiment.

FIG. 12 is a flowchart illustrating example operations of an electronic device, gateways, and a metaverse server according to an embodiment.

According to an embodiment, the electronic device 110 (e.g., the processor 111 of FIG. 1) may transmit an SIP-based INVITE message to the SIP gateway 1201 in operation 1211.

For example, the INVITE message may include identification information about the first metaverse service (or the first metaverse server 220) and user identification information in the first metaverse service. In operation 1213, the SIP gateway 1201 may transmit the INVITE message to the first metaverse server 220. The SIP gateway 1201 may transmit, for example, information associated with the caller side (e.g., identification information about the user of the caller side) and/or information associated with the receiver side (e.g., identification information about the user of the receiver side) to the first metaverse server 220, but the disclosure is not limited in this regard. In operation 1215, the electronic device 110 may transmit a RINGING message to the SIP gateway 1201. In operation 1217, the SIP gateway 1201 may transmit a RINGING message to the first metaverse server 220. The first metaverse server 220 may transmit an OK message to the SIP gateway 1201. For example, the first metaverse server 220 may transmit an OK message based on confirmation of acceptance of the video call received from an electronic device corresponding to the user of the receiver side through the session (e.g., the PDU session), but this is merely an example, and the trigger for transmitting the OK message is not limited thereto. In operation 1221, the SIP gateway 1201 may transmit an OK message to the electronic device 110. As described above, a media session (e.g., an MSRP session) may be established between the electronic device 110 and the first metaverse server 220. A call server (e.g., the call server 210) according to various embodiments may include, for example, an SIP gateway 1201 and/or an MSRP gateway 1203, and it will be appreciated by one of ordinary skill in the art that the procedure for establishing the MSRP session described with reference to FIG. 12 may be performed in the same manner in various embodiments of the disclosure. According to an embodiment, the electronic device 110 may transmit an MSRP message (e.g., media data) to the MSRP gateway 1203 in operation 1223. In operation 1225, the MSRP gateway 1203 may transmit an MSRP message (e.g., media data) to the first metaverse server 220. In operation 1227, the first metaverse server 220 may transmit an OK message to the MSRP gateway 1203. The MSRP gateway 1203 may transmit an OK message to the electronic device 110 in operation 1229. As described above, media data may be transmitted and received through a media session (e.g., an MSRP session). Although not illustrated, the electronic device 110 may receive data for representing a virtual space from the first metaverse server 220 to configure a screen of a video call. The electronic device 110 may display a virtual space using data as at least a portion of the screen of the video call. Meanwhile, as described with reference to FIGS. 10 and 11, the electronic device 110 may identify user manipulation information input corresponding to the content.

According to an embodiment, the electronic device 110 may transmit a control message including user manipulation information to the SIP gateway 1201 in operation 1231. In operation 1233, the SIP gateway 1201 may transmit a control message to the first metaverse server 220. In operation 1235, the first metaverse server 220 may transmit an OK message to the SIP gateway 1201. In operation 1237, the SIP gateway 1201 may transmit an OK message to the electronic device 110. As described above, the electronic device 110 may transmit a control message for changing a portion of the transmitted virtual space through the SIP gateway 1201, but the disclosure is not limited in this regard, and may be transmitted and received through the MSRP gateway 1203. The first metaverse server 220 may identify user manipulation information included in the control message, and may change a portion of the transmitted virtual space based on the user manipulation information. The first metaverse server 220 may transmit an MSRP message including data for representing the changed virtual space to the MSRP gateway 1203 in operation 1239. In operation 1241, the MSRP gateway 1203 may transmit an MSRP message to the electronic device 110. The electronic device 110 may provide content representing the changed virtual space using data included in the received MSRP message. In operation 1243, the electronic device 110 may transmit an OK message to the MSRP gateway 1203. In operation 1245, the MSRP gateway 1203 may transmit an OK message to the first metaverse server 220. As described above, media-related data may be transmitted and received through the MSRP gateway 1203, and control-related messages such as screen adjustment may be transmitted and received through the SIP gateway 1201.

Figure 13:
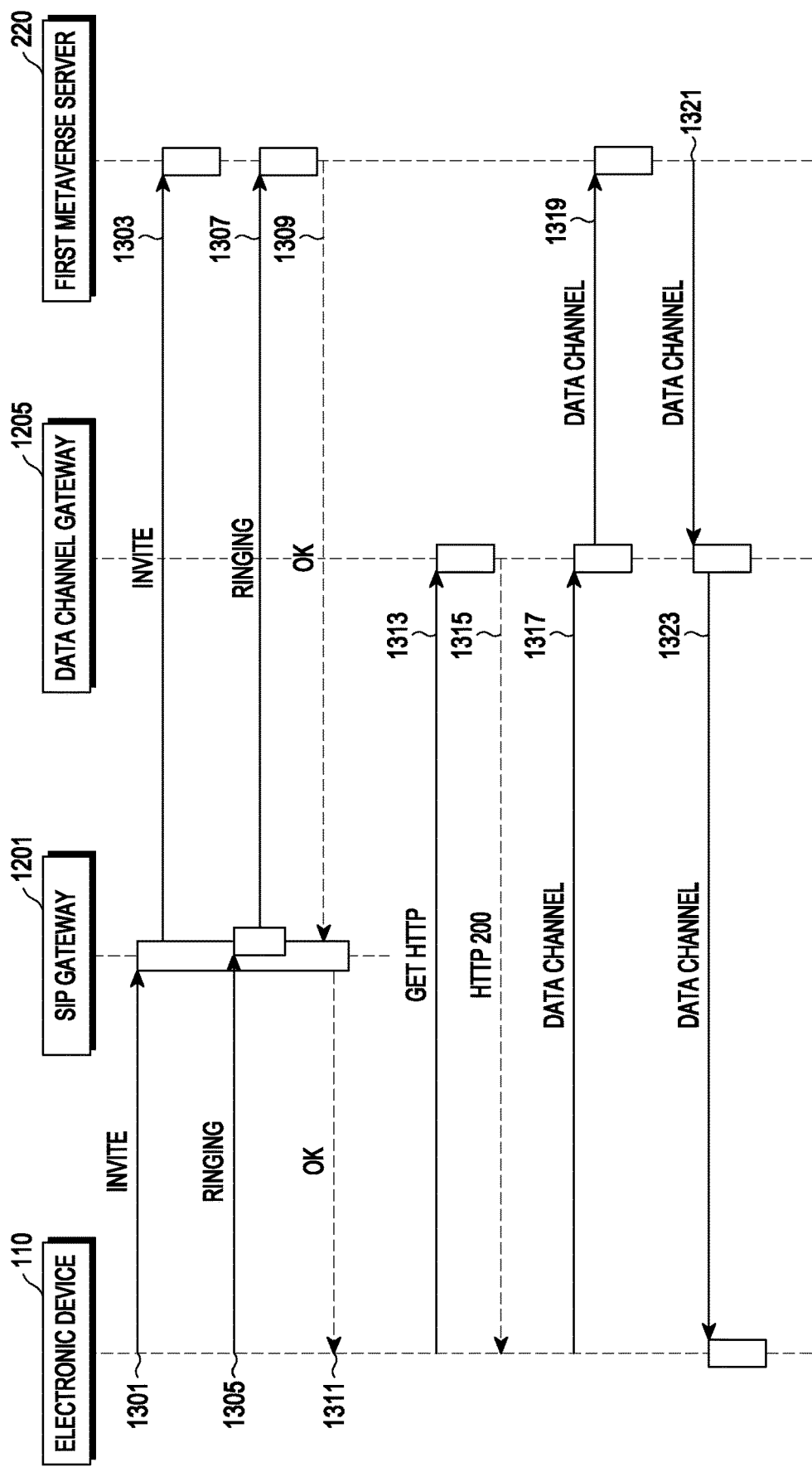
FIG. 13 is a flowchart illustrating example operations of an electronic device, gateways, and a metaverse server according to an embodiment.

FIG. 13 is a flowchart illustrating example operations of an electronic device, gateways, and a metaverse server according to an embodiment. Because operations 1301 to 1311 are substantially the same as operations 1211 to 1221 described with reference to FIG. 12, the description here is not repeated here.

According to an embodiment, the electronic device 110 (e.g., the processor 111 of FIG. 1) may transmit a GET HTTP message to the data channel gateway 1205 in operation 1313. In operation 1315, the electronic device 110 may receive an HTTP 200 message from the data channel gateway 1205. Through the above-described operation, the electronic device 110 may download an application providing a function of changing the displayed virtual space. In operation 1317, the electronic device 110 may transmit a data channel message to the data channel gateway 1205. The data channel message may include information for causing a change in the displayed virtual space. For example, the electronic device 110 may identify a user input for changing the displayed virtual space and may transmit a data channel message including information based on the user input. In operation 1319, the data channel gateway 1205 may transmit a data channel message to the first metaverse server 220. Although not illustrated, the first metaverse server 220 may transmit media data including the changed virtual space portion to the electronic device 110 through the MSRP gateway. Alternatively, when the first metaverse server 220 is required to transmit information for control, the first metaverse server 220 may transmit a data channel message including control information to the electronic device 110 through the data channel gateway 1205 through operations 1321 and 1323. As described above, media-related data may be transmitted and received through the MSRP gateway, and control-related messages such as screen adjustment may be transmitted and received through the data channel gateway 1205.

Figure 14:
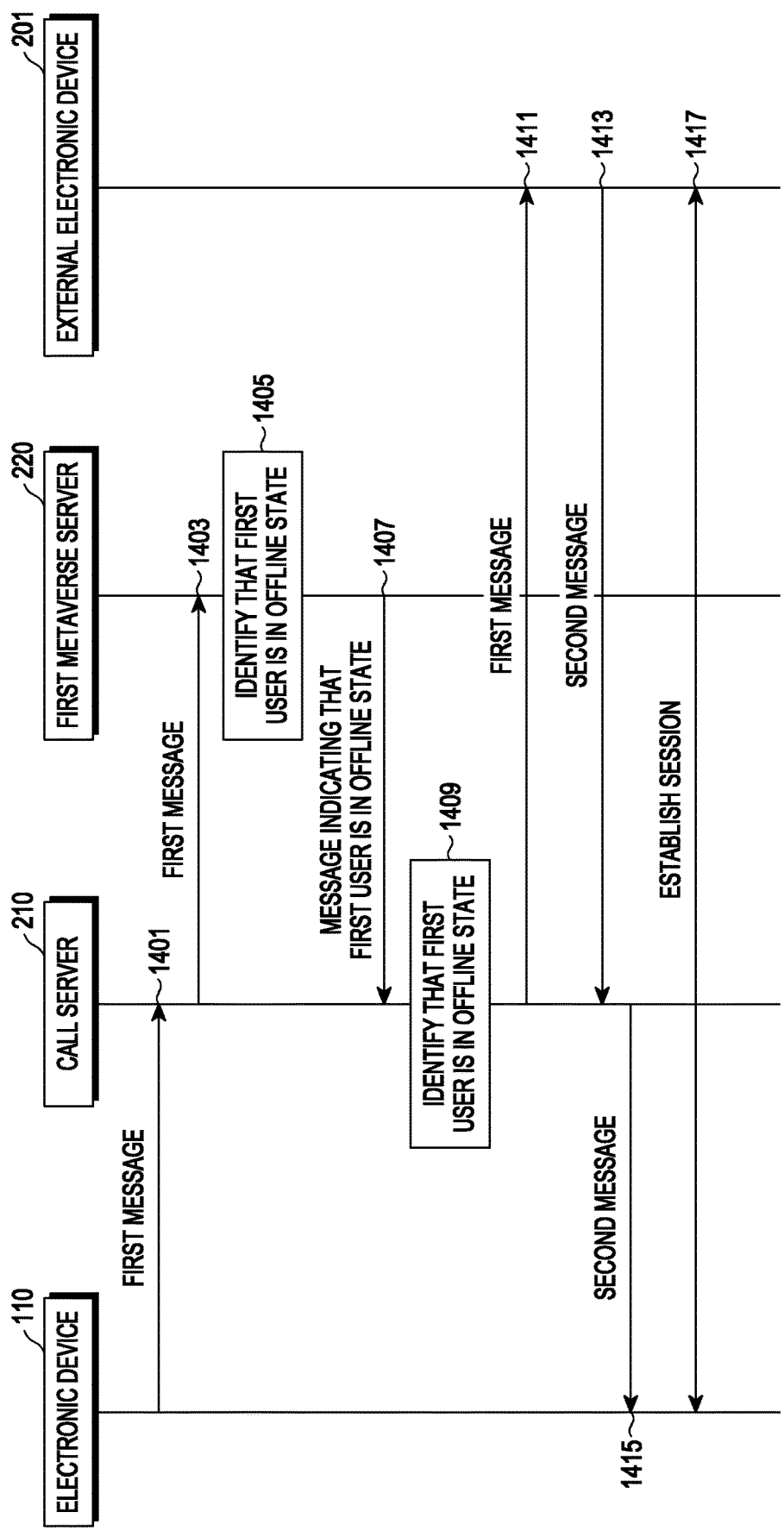
FIG. 14 is a flowchart illustrating example operations of an electronic device, a call server, and a metaverse server according to an embodiment.

FIG. 14 is a flowchart illustrating example operations of an electronic device, a call server, and a metaverse server according to an embodiment.

According to an embodiment, in operation 1401, the electronic device 110 (e.g., the processor 111 of FIG. 1) may transmit, to the call server 210, the first message including identification information about the first metaverse service (or the first metaverse server 220) and identification information about the first user in the first metaverse service. In operation 1403, the call server 210 may transmit the first message to the first metaverse server 220. In operation 1405, the first metaverse server 220 may identify that the first user, which is the receiver-side user designated in the first message, is currently offline. In operation 1407, the first metaverse server 220 may transmit a message indicating that the first user is in the offline state to the call server 210. In operation 1409, the call server 210 may identify that the first user is offline based on the received message. Based on identifying that the first user is in the offline state, the call server 210 may transmit the first message to the external electronic device 201 in operation 1411. For example, the call server 210 may change the caller's phone number to an SIP account. The call server 210 may transmit a first message using the SIP account of the receiver as the receiver to the external electronic device 201. For example, the external electronic device 201 may transmit a second message in response to the first message to the call server 210 in operation 1413, based on the user response. In operation 1415, the call server 210 may transmit the second message to the electronic device 110. Accordingly, a session 1417 may be established between the electronic device 110 and the external electronic device 201. The session 1417 may be, for example, a media session, but is not limited thereto. Meanwhile, as described with reference to FIG. 3, the external electronic device 201 may transmit an image related to the avatar stored in the first metaverse server 220, but this is merely an example, and those skilled in the art will understand that the type provided as the image of the video call is not limited, and that the image captured by the external electronic device 201 may be transmitted.

According to an example embodiment, an electronic device 110 may include at least one processor 111 and a communication device 117 (including, e.g., a communication circuit). The at least one processor 111 may be configured to identify a call generating request for first user identification information defined in a first metaverse service; establish, through the communication device 117, a media session between the electronic device 110 and a first server corresponding to the first metaverse service, based on the call generating request; receive, through the communication device 117, first data for representing a virtual space associated with an avatar corresponding to the first user identification information, using the media session; provide first content representing the virtual space associated with the avatar using the received first data; transmit a message including user manipulation information input corresponding to the content through the communication device 117; receive, through the communication device 117, second data for representing a virtual space associated with the avatar set based on the user manipulation information, using the media session; and provide second content representing the virtual space associated with the avatar using the received second data.

According to an example embodiment, the at least one processor 111 may be configured to, as at least part of establishing the media session, transmit a first message including first identification information for identifying the first metaverse service and the first user identification information through the communication device 117.

According to an example embodiment, the first message including the first identification information for identifying the first metaverse service and the first user identification information may be an SIP-based message.

According to an example embodiment, the media session may be established based on reception of an SIP-based second message after transmission of the first message.

According to an example embodiment, the first message may further include a first phone number corresponding to the electronic device 110.

According to an example embodiment, the at least one processor 111 may be further configured to transmit, through the communication device 117, an image captured by a camera module (including, e.g., a camera) included in the electronic device 110 using the media session.

According to an example embodiment, the captured image may be provided together with the first content or the second content.

According to an example embodiment, the at least one processor 111 may be configured to, as at least part of transmitting the message including the user manipulation information, transmit the message to the first server corresponding to the first metaverse service through an SIP gateway. The SIP gateway may be independent from the media session.

According to an example embodiment, the at least one processor 111 may be configured to, as at least part of transmitting the message including the user manipulation information, transmit the message to the first server corresponding to the first metaverse service through a data channel gateway. The data channel gateway may be independent from the media session.

According to an example embodiment, a method for operating an electronic device 110 may include identifying a call generating request for first user identification information defined in a first metaverse service; establishing a media session between an electronic device 110 and a first server corresponding to the first metaverse service, based on the call generating request; receiving first data for representing a virtual space associated with an avatar corresponding to the first user identification information, using the media session; providing first content representing the virtual space associated with the avatar, using the received first data; transmitting a message including user manipulation information input corresponding to the content; receiving second data for representing a virtual space associated with an avatar set based on the user manipulation information, using the media session; and providing second content representing the virtual space associated with the avatar, using the received second data.

According to an example embodiment, establishing the media session may include transmitting a first message including first identification information for identifying the first metaverse service and the first user identification information.

According to an example embodiment, the first message including the first identification information for identifying the first metaverse service and the first user identification information may be an SIP-based message.

According to an example embodiment, the media session may be established based on reception of an SIP-based second message after transmission of the first message.

According to an example embodiment, the first message may further include a first phone number corresponding to the electronic device 110.

According to an example embodiment, the method for operating the electronic device 110 may further include transmitting an image captured by a camera module (including, e.g., a camera) included in the electronic device 110 using the media session.

According to an example embodiment, the captured image may be provided together with the first content or the second content.

According to an example embodiment, the transmitting of the message including the user manipulation information may transmit the message to the first server corresponding to the first metaverse service through an SIP gateway. The SIP gateway may be independent from the media session.

According to an example embodiment, transmitting the message including the user manipulation information may transmit the message to the first server corresponding to the first metaverse service through a data channel gateway. The data channel gateway may be independent from the media session.

According to an example embodiment, an electronic device 110 may include at least one processor 111 and a communication device 117 (including, e.g., a communication circuit). The at least one processor 111 may be configured to access, through the communication device 117, a first server corresponding to a first metaverse service, based on first user identification information defined in the first metaverse service; receive, through the communication device 117, first data for representing a virtual space associated with an avatar corresponding to the first user identification information about the first metaverse service; provide first content representing the virtual space associated with the avatar using the received first data; further provide, while providing the first content, an object indicating that a video call based on second user identification information about the first metaverse service is requested; transmit an accept message for the video call to the first server through the communication device 117, based on identifying the acceptance for the video call corresponding to the object; receive a virtual space associated with an avatar corresponding to the first user identification information about the first metaverse service and second data for representing an image corresponding to the second user identification information; and provide first content representing the virtual space associated with the avatar and the image using the received second data.

According to an example embodiment, the at least one processor 111 may be configured to identify a user input for selecting a portion of a virtual space transmitted to the electronic device 110 corresponding to the second user identification information; and transmit a message including information associated with the user input to the first server through the communication device 117.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 110). For example, a processor (e.g., the processor 111) of the machine (e.g., the electronic device 110) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data being temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one processor; and
   a communication device,
   wherein the at least one processor is configured to:
   identify a call generating request for first user identification information defined in a first metaverse service,
   establish, through the communication device, a media session between the electronic device and a first server corresponding to the first metaverse service based on the call generating request,
   receive, through the communication device, first data for representing a virtual space associated with an avatar corresponding to the first user identification information using the media session,
   provide first content representing the virtual space associated with the avatar using the received first data,
   transmit, through the communication device, a message including user manipulation information input corresponding to the content,
   receive, through the communication device, second data for representing the virtual space configured based on the user manipulation information using the media session, and
   provide second content representing the virtual space associated with the avatar using the received second data.

2. The electronic device of claim 1, wherein the at least one processor is configured to, as at least part of establishing the media session:
   transmit, through the communication device, a first message including first identification information for identifying the first metaverse service and the first user identification information.

3. The electronic device of claim 2, wherein the first message including the first identification information and the first user identification information comprises a session initiation protocol (SIP)-based message.

4. The electronic device of claim 2, wherein the media session is established based on receiving an SIP-based second message after transmitting the first message.

5. The electronic device of claim 2, wherein the first message further includes a first phone number corresponding to the electronic device.

6. The electronic device of claim 1, further comprising:
   a camera module, and
   wherein the at least one processor is further configured to:
   transmit, through the communication device, an image captured by the camera module using the media session.

7. The electronic device of claim 6, wherein the captured image is provided together with the first content or the second content.

8. The electronic device of claim 1, wherein the at least one processor is configured to, as at least part of transmitting the message including the user manipulation information:
   transmit, through an SIP gateway, the message to the first server, and
   wherein the SIP gateway is independent from the media session.

9. The electronic device of claim 1, wherein the at least one processor is configured to, as at least part of transmitting the message including the user manipulation information:
   transmit, through a data channel gateway, the message to the first server, and
   wherein the data channel gateway is independent from the media session.

10. A method for operating an electronic device, the method comprising:
    identifying a call generating request for first user identification information defined in a first metaverse service;
    establishing a media session between the electronic device and a first server corresponding to the first metaverse service based on the call generating request;
    receiving first data for representing a virtual space associated with an avatar corresponding to the first user identification information using the media session;
    providing first content representing the virtual space associated with the avatar using the received first data;
    transmitting a message including user manipulation information input corresponding to the content;
    receiving second data for representing the virtual space configured based on the user manipulation information using the media session; and
    providing second content representing the virtual space associated with the avatar using the received second data.

11. The method of claim 10, wherein establishing the media session includes transmitting a first message including first identification information for identifying the first metaverse service and the first user identification information.

12. The method of claim 11, wherein the first message including the first identification information and the first user identification information is an SIP-based message.

13. The method of claim 11, wherein the media session is established based on receiving an SIP-based second message after transmitting the first message.

14. The method of claim 11, wherein the first message further includes a first phone number corresponding to the electronic device.

15. The method of claim 10, further comprising transmitting an image captured by a camera module included in the electronic device using the media session.

16. The method of claim 15, wherein the captured image is provided together with the first content or the second content.

17. The method of claim 10, wherein transmitting the message including the user manipulation information includes transmitting, through an SIP gateway, the message to the first server, and
   wherein the SIP gateway is independent from the media session.

18. The method of claim 10, wherein transmitting the message including the user manipulation information includes transmitting, through a data channel gateway, the message to the first server, and
wherein the data channel gateway is independent from the media session.

19. An electronic device comprising:
at least one processor; and
a communication device,
wherein the at least one processor is configured to:
    access, through the communication device, a first server corresponding to a first metaverse service based on first user identification information defined in the first metaverse service,
    receive, through the communication device, first data for representing a virtual space associated with an avatar corresponding to the first user identification information of the first metaverse service,
    provide first content representing the virtual space using the received first data,
    further provide an object representing that a video call based on second user identification information about the first metaverse service is requested while providing the first content,
    transmit, through the communication device, an accept message for the video call to the first server, based on identifying acceptance for the video call corresponding to the object,
    receive second data for representing the virtual space and an image corresponding to the second user identification information, and
    provide first content representing the virtual space and the image using the received second data.

20. The electronic device of claim 19, wherein the at least one processor is further configured to:
    identify a user input for selecting a portion of the virtual space transmitted to the electronic device corresponding to the second user identification information, and
    transmit, through the communication device, a message including information associated with the user input to the first server.

* * * * *